（12）United States Patent
Kedenburg, III

(10) Patent No.: US 10,075,740 B2
(45) Date of Patent: Sep. 11, 2018

(54) PROVIDING ENHANCED LIVE VIDEO

(71) Applicant: Facebook, Inc., Menlo Park, CA (US)

(72) Inventor: George Lewis Kedenburg, III, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 15/359,451

(22) Filed: Nov. 22, 2016

(65) Prior Publication Data

US 2018/0146217 A1 May 24, 2018

(51) Int. Cl.
H04N 7/173 (2011.01)
H04N 21/2187 (2011.01)
H04N 21/234 (2011.01)
H04N 21/431 (2011.01)
H04N 21/472 (2011.01)

(52) U.S. Cl.
CPC ... *H04N 21/2187* (2013.01); *H04N 21/23418* (2013.01); *H04N 21/4312* (2013.01); *H04N 21/472* (2013.01)

(58) Field of Classification Search
CPC ......... H04N 21/2187; H04N 21/23418; H04N 21/4312; H04N 21/472
See application file for complete search history.

(56) References Cited

U.S. PATENT DOCUMENTS

| 8,522,289 | B2* | 8/2013 | Athsani | G06Q 30/02 707/733 |
| 8,752,113 | B1* | 6/2014 | Good | H04N 19/40 725/115 |
| 8,910,217 | B2* | 12/2014 | Tjio | H04N 21/2187 370/329 |
| 2005/0188399 | A1* | 8/2005 | Tischer | H04N 7/16 725/34 |
| 2008/0072261 | A1* | 3/2008 | Ralston | G11B 27/034 725/62 |
| 2016/0066053 | A1* | 3/2016 | Bielman | H04N 21/482 725/41 |
| 2016/0286244 | A1* | 9/2016 | Chang | H04N 21/21805 |

* cited by examiner

*Primary Examiner* — John Schnurr
(74) *Attorney, Agent, or Firm* — Keller Jolley Preece

(57) ABSTRACT

The present disclosure is directed toward systems and methods for providing an enhanced live video presentation to one or more viewers of a live video stream. In particular, the systems and methods described herein involve detecting a live video stream at an event and, based on received information about the event, generating a video enhancement overlay for the live video stream. In addition, the systems and methods involve providing, for display to one or more viewers, an enhanced live video presentation that includes the live video stream and the video enhancement overlay including information about the event. In this way, systems and methods described herein facilitate an enhanced user experience for broadcasters and viewers of live video content.

20 Claims, 11 Drawing Sheets

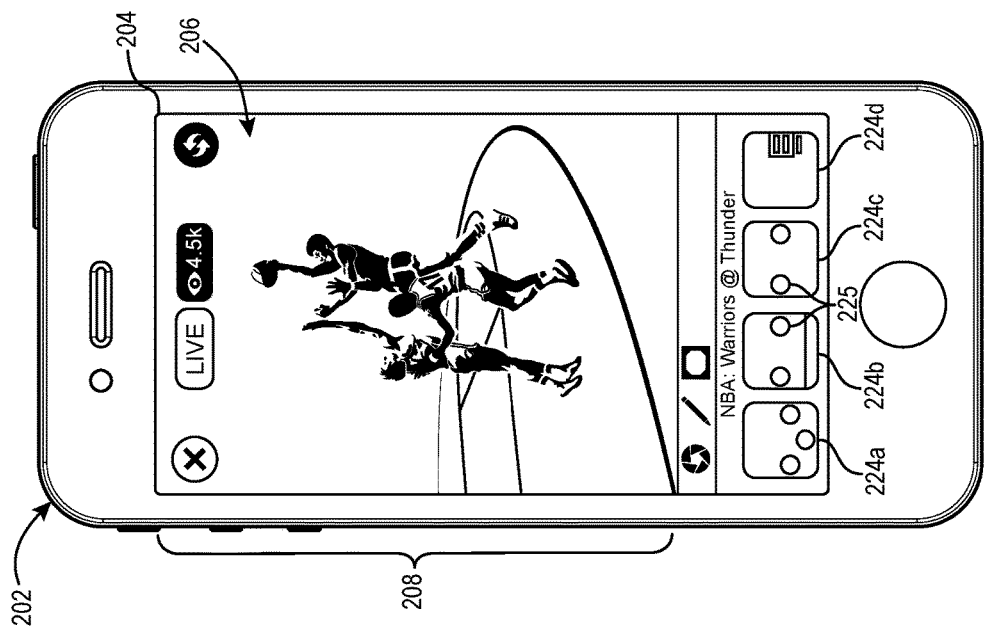
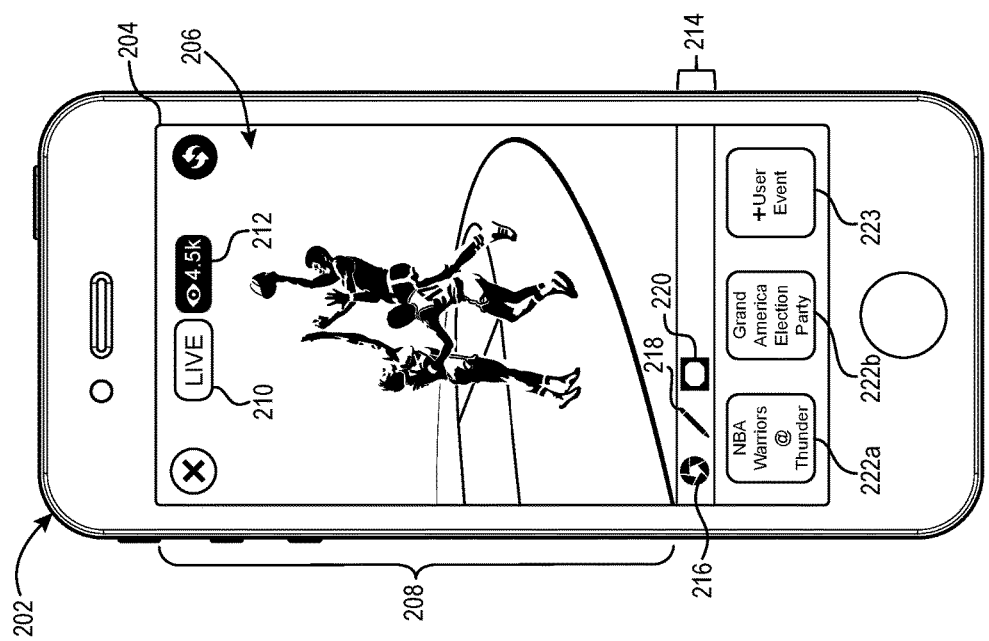

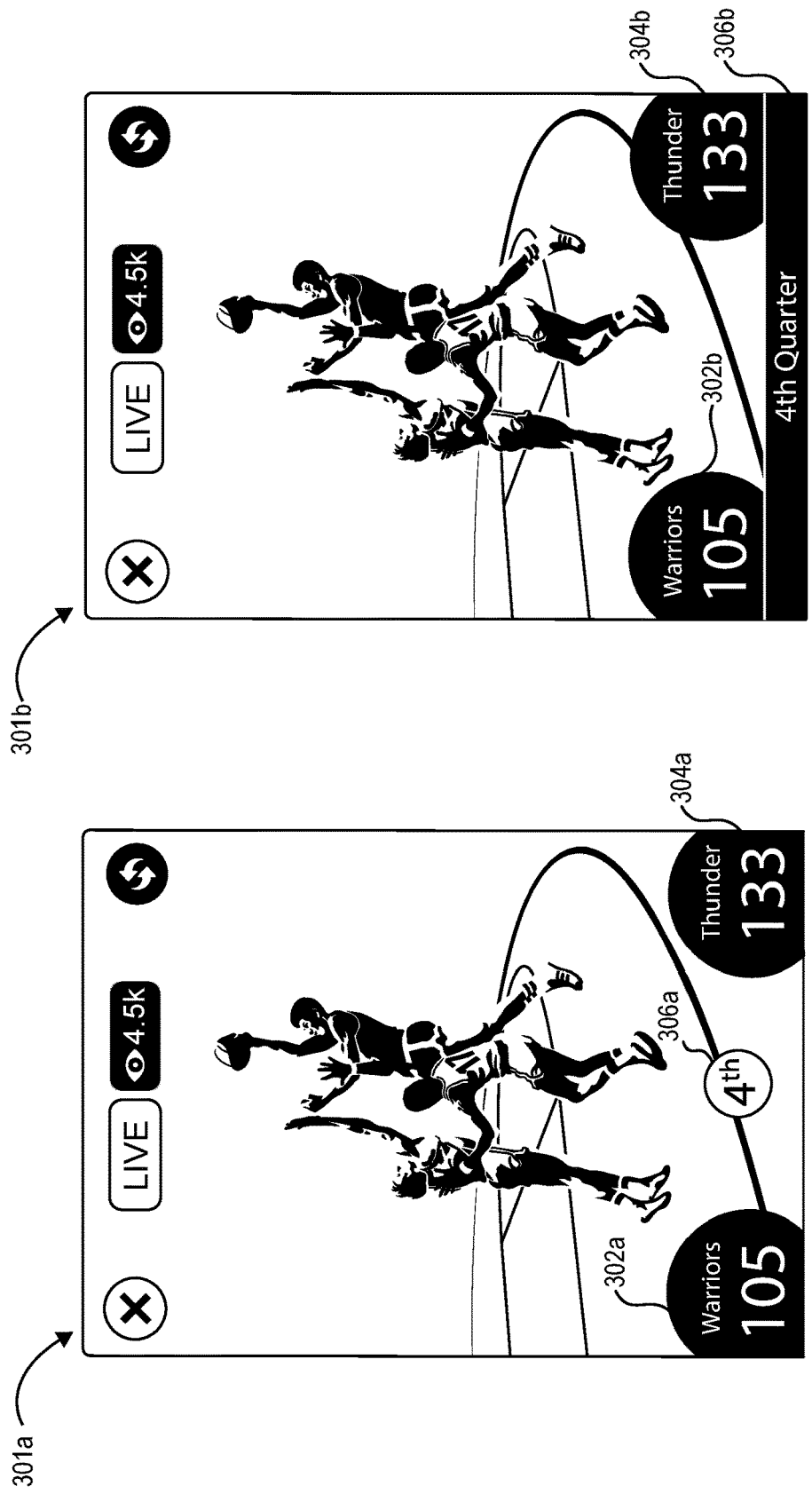

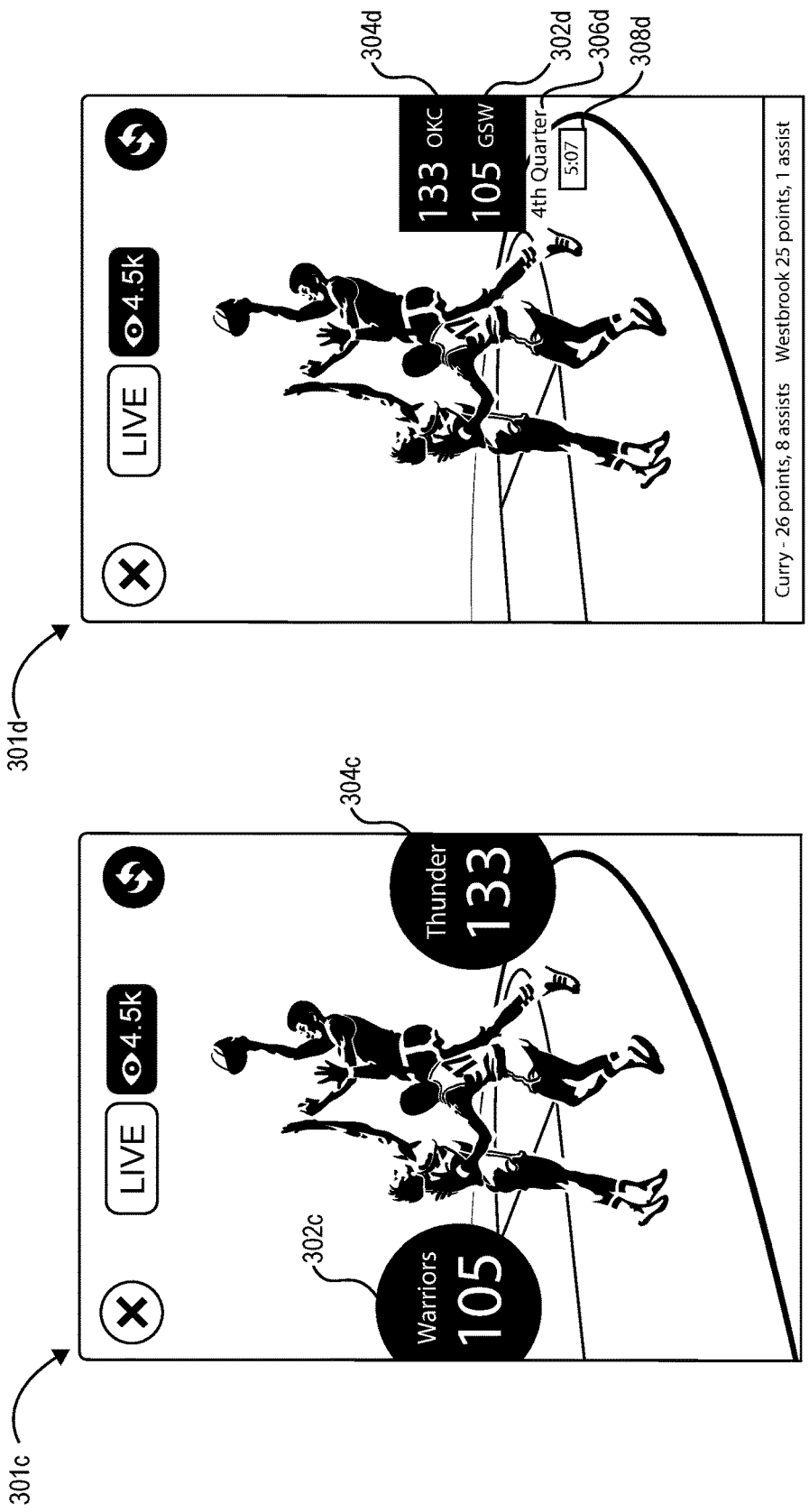

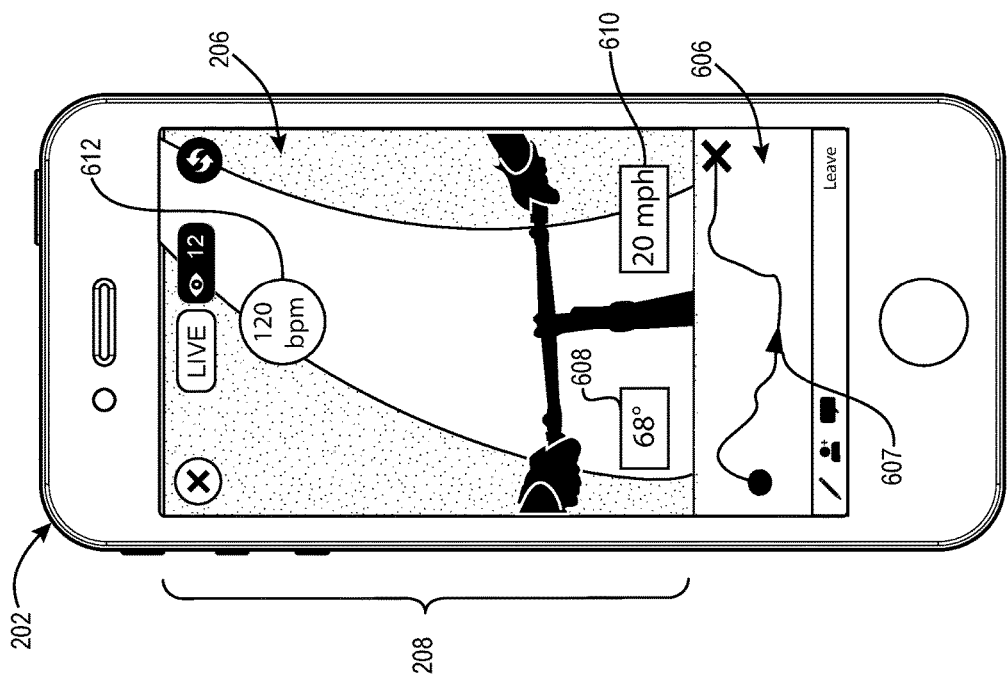
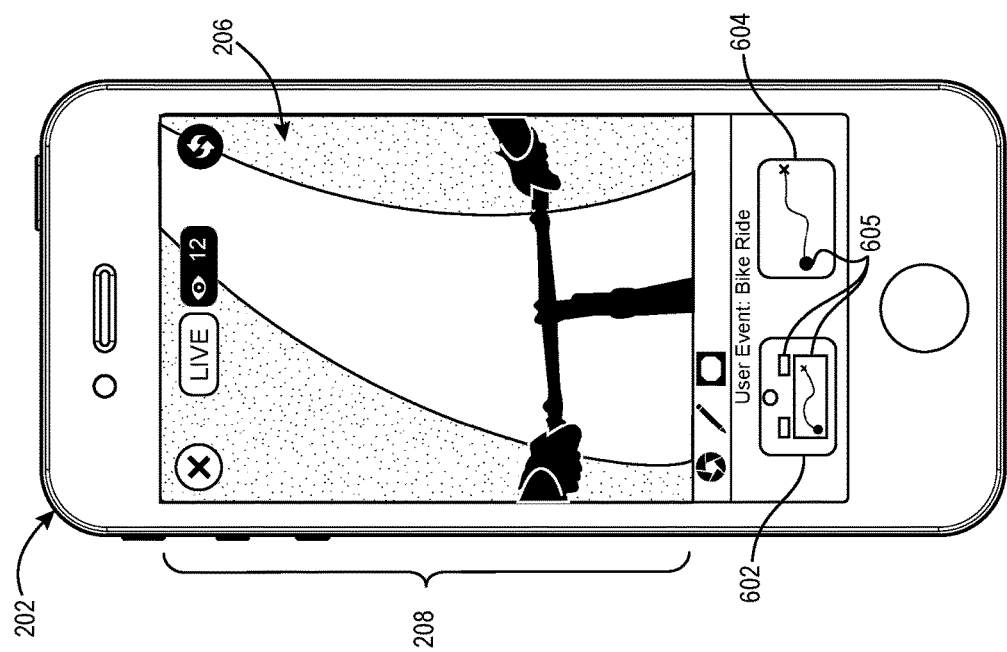

PROVIDING ENHANCED LIVE VIDEO

BACKGROUND

Video communication provides an increasingly popular method for connecting via a social networking system. For example, where social networking systems once limited users to communicate via written electronic communications, users can now communicate electronically via images or videos taken from a personal computing device, such as a smart phone. Indeed, social networking systems now enable users to broadcast live video streams as a method for communicating with other social networking system co-users. To illustrate, a social networking system user can broadcast a live video stream, captured by a smartphone camera, to one or more social networking system co-users. The live video stream depicts the broadcaster in a non-time-shifted display (e.g., a live display).

Despite the ability to broadcast live video communications, broadcasting live video is generally limited to broadcasting a plain video capture (e.g., the video broadcast includes only image content captured by a camera). For example, broadcasting live often involves broadcasting video content from a mobile computing device such as a smart phone, which are limited in processing power to provide editing or enhancement capabilities for a broadcaster to enhance a broadcast of a live video. In particular, due to the limited computing resources on a smart phone, for example, conventional video editing systems are unable to provide a video editing option that allows a smart phone to simultaneously capture video content, enhance the video content, and broadcast the enhanced video content without also overwhelming the computing resources of most mobile devices, which would result in a poor quality broadcast.

Moreover, conventional video editing systems relate primarily to performing video enhancements on a pre-recorded video file. For example, conventional video editing systems enable adding enhancements and other special effects to a video that was previously captured and saved as a digital video file. In addition, conventional editing systems involve time-consuming user review and previewing of the video to combine enhancements and edits to the video. As a result, conventional video editing systems fail to provide broadcasters of a live video stream with even an opportunity to enhance a live video since a live video is generated from a current feed from a camera, and not from a pre-captured digital video file.

Due to the technical limitations and shortcomings of conventional video editing systems, conventional video broadcasts often result in plain video that does little to engage viewers. Moreover, plain video often fails to provide relevant information to better understand context or circumstances a video broadcast. Accordingly, and as a result of special effects and enhancements to TV and movies, plain video broadcasts often appear boring, unoriginal, an unengaging to most viewers. Accordingly, conventional systems for broadcasting live videos have a number of disadvantages.

SUMMARY

One or more embodiments described herein provide benefits and/or solve one or more of the foregoing or other problems in the art with systems and methods for enhancing a live video stream. For example, in one or more embodiments, the systems and methods detect an event (e.g., a location of an event) associated with a live video stream originating from a broadcasting device. Further, the systems and methods generate a video enhancement overlay for the live video stream that includes dynamic information associated with the event. In addition, the systems and methods involve providing, for display to one or more viewers, an enhanced live video presentation that includes both live video content in conjunction with the video enhancement overlay.

Thus, in one or more embodiments, the systems and methods enhance a live video stream using dynamic information associated with the live video stream. In particular, in one or more embodiments, the systems and methods gather or otherwise receive dynamic information associated with an event at which a broadcasting device captures the live video stream. The systems and methods identify a video overlay template for the event including one or more fields corresponding to dynamic information associated with the event. Further, the systems and methods involve generating the video enhancement overlay including populating the field(s) of the video overlay template with the dynamic information. Thus, the systems and methods enhance a presentation of the live video stream by providing, in conjunction with the live video stream, a display of the video enhancement overlay including the received dynamic information within the respective fields.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited systems and methods provide various advantages and features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which:

FIG. 2A-2B illustrate example graphical user interfaces for selecting a video template overlay for a live video stream in accordance with one or more embodiments;

FIGS. 3A-3D illustrate example graphical user interfaces including a display of a live video stream and a video enhancement overlay in accordance with one or more embodiments;

FIGS. 6A-6B illustrate example graphical user interfaces for creating an event and generating a video enhancement overlay for the event in accordance with one or more embodiments;

DETAILED DESCRIPTION

Figure 1:
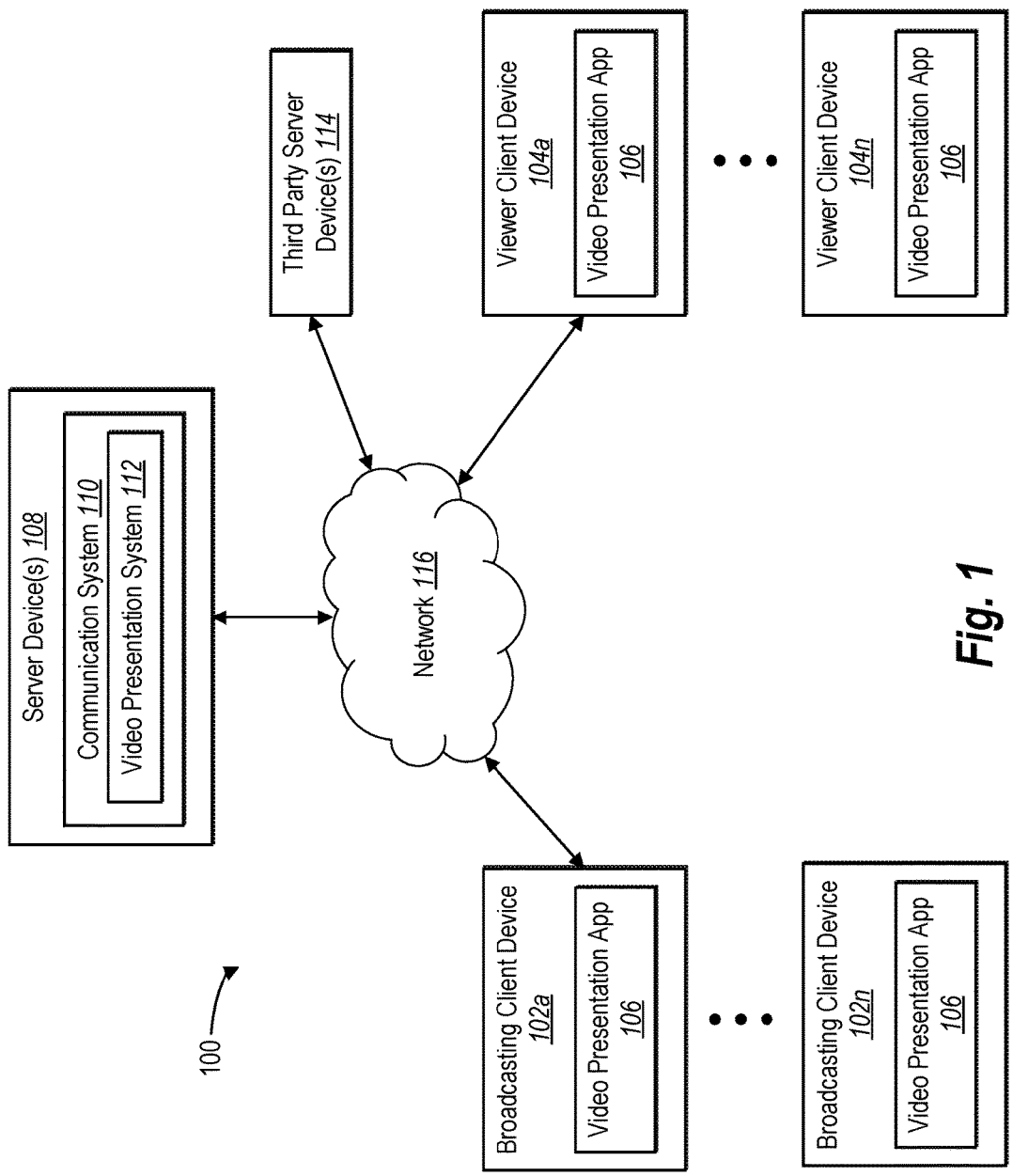
FIG. 1 illustrates a block diagram of an environment in which a video presentation system is implemented in accordance with one or more embodiments.

One or more embodiments described herein include a video presentation system that allows a broadcaster to enhance and share a live video stream using a mobile computing device (e.g., a smart phone). In particular, the video presentation system enables a broadcaster to capture a live video stream with the broadcasting device, select one or more enhancements to provide in conjunction with the live video stream, and accordingly, create an enhanced live video presentation to provide to one or more viewer client devices. In particular, as will be described in further detail below, the video presentation system gathers information associated with a live video stream and generates a video enhancement overlay that includes information associated with the live video stream. Further, the video presentation system provides the live video stream and the video enhancement overlay as an enhanced live video presentation to one or more viewer client devices. As used herein, an "enhanced live video presentation" refers to a digital media presentation including live video content (e.g., video content provided in conjunction with capturing the video content) displayed with one or more enhancements to the live video content.

In one or more embodiments, the video presentation system enhances a live video stream using information associated with an event (or simply "event information"). As used herein, an "event" refers to an occurrence or occasion associated with a location and/or time period. For example, an event can include a public event such as a sporting event, a concert event, a political rally, a parade, or any public event. Additionally, an event can include a time period that corresponds to a public holiday, e.g., New Year's Eve, Thanksgiving, etc. Alternatively, an event may refer to a private event, such as a picnic, a hike, a bike ride, a family dinner, a birthday party, or any other private occurrence. Thus, event information can refer to any information corresponding to a particular event. Various examples of events and event information are described in further detail below.

In one or more embodiments, the video presentation system gathers or otherwise receives event information from one or more sources, and dynamically provides the event information within a video enhancement overlay associated with a live video stream. For example, in one or more embodiments, the video presentation system receives event information from a third party server device (e.g., a web-server that hosts information about sporting events). As another example, in one or more embodiments, the video presentation system receives event information from the broadcasting device (e.g., user input information about a private event). As a further example, in one or more embodiments, the video presentation system receives event information from multiple broadcasting devices capturing live video at the same event.

Using the dynamic information associated with the event, the video presentation system generates a video enhancement overlay including event information to display in conjunction with the live video stream. In particular, and as will be described in further detail below, the video presentation system identifies a video overlay template including one or more fields that correspond to discrete portions of the event information. The video presentation system dynamically populates the one or more fields within the video overlay template with the event information to create the video enhancement overlay. As a brief example, a video overlay template for a sporting event may include fields associated with the score, and the event information may include the score of the sporting event. Thus, the video presentation system generates a video enhancement overlay that dynamically includes the score of the sporting event, and provides the video enhancement overlay in conjunction with a live video stream of the sporting event.

As used herein, a "video overlay template" refers to a graphical object including one or more fields for displaying information in conjunction with video content. For example, in one or more embodiments, a video overlay template includes a framework of fields sized and positioned to overlay at least a portion of a video display (e.g., a live video stream display). In one or more embodiments, the video overlay template includes fields (e.g., blank fields) dedicated to discrete types of information related to an event associated with the video content. As an illustrative example, a video overlay template for a sporting event may include fields dedicated to scores, time duration (e.g., remaining time), team or individual stats, scores of other teams in the same league or division, or other dynamic information that changes through progression of the sporting event.

As used herein, a "video enhancement overlay" refers to a video overlay template in which one or more fields of the video overlay template have been populated with event information. For example, in one or more embodiments, the video presentation system generates the video enhancement overlay by populating fields of the identified video overlay template with discrete portions of the event information and provides the video enhancement overlay including the populated fields together with the live video stream. Therefore, the video presentation system provides a presentation that includes both the live video stream from a broadcaster device and the video enhancement overlay to one or more viewer devices.

In addition, and as will be described in further detail below, the video presentation system enables a broadcaster to further customize the presentation of the live video stream. For example, in one or more embodiments, the video presentation system enables a broadcaster to create an event associated with the live video stream and generate a video enhancement overlay for the event. As another example, in one or more embodiments, the video presentation system provides customized enhancements (e.g., graphical elements, animations) in conjunction with the presentation of the live video stream to further improve the viewing experience.

Furthermore, in one or more embodiments, the video presentation system facilitates display of event information in conjunction with a live video stream originating from a broadcasting device located at the event. In particular, one or more embodiments, the video presentation system enables viewers of the live video stream to view supplemental and/or contextual information about the event to better understand and appreciate the content displayed within the live video stream. Moreover, providing the event information within the video enhancement overlay provides dynamic information that changes as the event progresses, thus further improving the viewing experience for viewers of the live video stream.

The video presentation system further enhances the live video stream without utilizing substantial processing power of the broadcasting and/or viewing device(s). For example, the video presentation system identifies one or more video overlay templates and populates fields of the video overlay template(s) with the event information to generate the video enhancement overlay. Thus, rather than modifying the live video stream or otherwise enhancing the live video stream on the fly, the video presentation system generates the video enhancement overlay by populating fields of a video overlay template and providing an enhanced live video presentation that includes both the live video stream and the video enhancement overlay.

As will be described in further detail below, in one or more embodiments, the video presentation system provides the video enhancement overlay by populating fields of a video overlay template and providing the video enhancement overlay to a viewer client device for display. In particular, a server device generates a video enhancement overlay including event information and provides the video enhancement overlay to the viewer client device. In addition, upon detecting that event information has changed, the video presentation system generates a new video enhancement overlay to provide to the viewer device or, alternatively, updates the video enhancement overlay by providing the new event information to the viewer device to include within the video enhancement overlay.

Alternatively, in one or more embodiments, rather than populating the video overlay template and providing the video enhancement overlay to the viewer device, the video presentation system provides an indicator of a template and event information to the viewer device to enable the viewer device to locally generate the video enhancement overlay on the viewer device. For example, where the viewer device has a live video application thereon and locally stores various templates associated with events (or particular types of events), the video presentation system can simply provide event information to the viewer device to enable the viewer device to generate the video enhancement overlay by populating fields of a locally stored or otherwise accessible video overlay template. In this way, the video presentation system provides and updates the video enhancement overlay using very little bandwidth and without communicating large amounts of information (in addition to general event information) between a viewer device and one or more server devices of a social networking system.

In addition, the video presentation system facilitates enhancement of a live video presentation without requiring that a broadcaster engage in time-consuming editing after the video has been recorded and stored to a computing device. Rather, the video presentation system generates the video enhancement overlay based on dynamic information associated with an event and simply modifies the presentation of the live video stream by providing the video enhancement overlay in conjunction with the live video stream. Thus, the video presentation system enhances a presentation of the live video stream while also avoiding the computer resource intensive and time intensive process of modifying video content. Moreover, the video presentation system enables the enhancement of a live video stream by removing the conventional steps of downloading and/or storing video content prior to implementing the various enhancements.

Additional detail will now be provided regarding an example environment including the video presentation system implemented therein. For example, FIG. 1 illustrates a schematic diagram illustrating an example live video presentation environment 100 for performing the processes and features described herein. As illustrated in FIG. 1, the video presentation environment 100 includes broadcasting client devices 102a-n having a video presentation application 106 thereon, and viewer client devices 104a also having the video presentation application 106 thereon. As further shown in FIG. 1, the video presentation environment 100 includes server device(s) 108 including a communication system 110 that further includes a video presentation system 112 implemented thereon. As used herein, the communication system 110 can include a social networking system. Thus, as described herein, a "communication system" may refer specifically to a social networking system as described in further detail below in connection with FIGS. 9-10. In addition, in one or more embodiments, the video presentation environment 100 includes third party server device(s) 114.

In one or more embodiments, the broadcasting client devices 102a-n, the viewer client devices 104a-n, the server device(s) 108, and the third party server device(s) 114 communicate via a network 116, which may include one or more networks and may use one or more communication platforms or technologies suitable for transmitting data and/or communication signals. In one or more embodiments, the network 116 includes the Internet or World Wide Web. In addition, or as an alternative, the network 116 can include various other types of networks that use various communication technologies and protocols, such as a corporate intranet, a virtual private network ("VPN"), a local area network ("LAN"), a wireless local network ("WLAN"), a cellular network, a wide area network ("WAN"), a metropolitan area network ("MAN"), or a combination of two or more such networks. Additional details relating to the network 116 are explained below with reference to FIG. 9.

Although FIG. 1 illustrates a particular number and arrangement of client devices, in one or more embodiments, one or more of the broadcasting client devices 102a-n, viewer client devices 104a-n, and/or the third party server 114 may directly communicate with the communication system or via an alternative communication network, bypassing the network 116. Further, in one or more embodiments, the video presentation environment 100 includes any number of broadcasting client devices 102a-n and viewer client devices 104a-n as well as additional client devices authorized to interact with one or more of the broadcasting client devices 102a-n.

In one or more embodiments, the broadcasting client devices 102a-n and the viewer client devices 104a-n can refer various types of computing devices. For example, one or more of the broadcasting client devices 102a-n and the viewer client devices 104a-n may include a mobile device such as a mobile telephone, a smartphone, a PDA, a tablet, or a laptop. Additionally, or alternatively, one or more of the broadcasting client devices 102a-n and the viewer client devices 104a-n may include a non-mobile device such as a desktop computer, a server, or another type of computing device. It will be understood that a broadcasting client device and a viewer client device can include the same type of computing functionality. In other words, in a preferred embodiment, both the broadcasting client device and the one or more viewer client devices are mobile computing devices, such as smartphones.

A broadcasting client device refers to a client device from where a live video stream originates, while the viewer client device refers to a client device that presents a live video stream for a user to view. In at least one embodiment, the user of a broadcasting client device (e.g., a broadcaster or broadcasting user) and the user of a viewer client device (e.g., a viewer or viewing user) include associated co-users (e.g., "friends") of the communication system. Additional details with respect to the broadcasting client devices 102a-n and the viewer client devices 104a-n are discussed below with respect to FIG. 8.

As further illustrated in FIG. 1, the broadcasting client devices 102a-n and the viewer client devices 104a-n can include the video presentation application 106. In general, the video presentation application 106 provides and controls various features and functionality on the broadcasting client devices 102a-n to enable the broadcasting client devices 102a-n to capture and provide a live video stream within an enhanced live video presentation. On the other hand, the video presentation application 106 provides and controls various features and functionality on the viewer client devices 104a-n to enable the viewer client devices 104a-n to present an enhanced live video presentation. In one or more embodiments, the video presentation application 106 is a native application specific to the video presentation system 112. In other embodiments, for example, the video presentation application 106 may be a web browser used to access the video presentation system 112.

As will be described in additional detail herein, the video presentation application 106 can cause a client device (e.g., broadcasting client device or viewer client device) to display one or more GUIs having one or more display elements (e.g., graphical elements). The video presentation application 106 enables a user (e.g., a broadcaster or a viewer) to interact with the display elements within the one or more GUIs for a variety of purposes related to producing and viewing an enhanced live video presentation. FIGS. 2A-6B and the description that follows illustrate various example embodiments of the GUIs that show various features of the video presentation system 112.

As mentioned above, the video presentation system 112 enables a broadcaster to initiate a live video stream from a first broadcasting device 102a to be viewed by one or more viewers via a display of one or more viewer client devices 104a-n. As used herein, the term "broadcaster" refers to a user that operates a client device to capture and initiate a live video presentation to provide to one or more viewer users. Also as used herein, the term "viewer" refers to a user of a client device who views a live video stream (e.g., an enhanced live video presentation). In one or more embodiments, the broadcaster and the viewer are users of the communication system.

To provide an enhanced live video presentation to viewers, a broadcaster initiates a live video stream by capturing video content using a first broadcasting client device 102a. As the first broadcasting client device 102a captures live video content, the first broadcasting client device 102a provides the live video content to the server device 108 to be provided to any number of viewers via the viewer client devices 104a-n. In particular, in one or more embodiments, the broadcasting client device 102a streams or otherwise continuously provides portions of the live video content to the server device 108. While the server device 108 receives the video content, the server device 108 can stream the live video content to the viewer client device(s) 104a-n via a live video stream. Thus, the first broadcasting client device 102a can provide a live video stream to any number of viewer client devices 104a-n via the server device 108.

Concurrent with capturing and providing the live video stream, the video presentation system 112 receives event information associated with the live video stream. More specifically, in one or more embodiments, the video presentation system 112 receives dynamic information associated with a location and/or time at which the first broadcasting client device 102a captures the live video content. As will be described in further detail below, the video presentation system 112 receives the event information from various sources. For example, as shown in FIG. 1, the video presentation system 112 can receive event information from one or multiple broadcasting client devices 102a-n capturing live video content while at the location of the event. In addition, the video presentation system 112 can receive event information from a third party server device 114. Moreover, in one or more embodiments, the video presentation system 112 accesses event information available within the communication system.

As mentioned above, and as will be described in further detail below, upon obtaining event information, the video presentation system 112 generates an enhanced live video presentation by generating a video enhancement overlay for display in conjunction with a live video stream display. In particular, in one or more embodiments, the video presentation system 112 identifies a video overlay template that includes one or more fields corresponding to portions of the event information. Based on the identified video overlay template, the video presentation system 112 generates a video enhancement overlay for the live video stream by populating the fields of the video overlay template.

Using the video enhancement overlay, the video presentation system 112 causes the server device to provide an enhanced presentation of the live video stream to any number of viewer client devices 104a-n. For example, in one or more embodiments, the video presentation system 112 causes the server device 108 to provide the video enhancement overlay to the viewer devices 104a-n to be displayed on the viewer client devices 104a-n in conjunction with the live video stream.

Alternatively, in one or more embodiments, the video presentation system 112 provides the event information (or discrete portions of the event information) as well as an identification of a video overlay template to enable the viewer client devices 104a-n to generate a presentation of the live video stream that includes both the live video stream and the video enhancement overlay. For example, in one or more embodiments, the various client devices (e.g., broadcasting client devices 102a-n and viewer client devices 104a-n) include or otherwise have access to a database of video overlay templates. In one or more embodiments, the video presentation system 112 provides an identifier of a template stored on a respective client device to enable the video presentation application 106 to identify a video overlay template and populate fields of the identified video overlay template with received event information. In particular, in one or more embodiments, the video presentation application 106 receives event information and locally generates the video enhancement overlay using a locally accessed video overlay template and based on event information received from the server device 108.

In addition, in one or more embodiments, the video presentation system 112 provides event information to the viewer client devices 104a-n as the event information changes to enable the viewer client devices 104a-n to update the video enhancement overlay. For example, in one or more embodiments, upon detecting a change in one or more discrete portions of the event information, the video presentation system 112 provides the updated event information to the viewer client devices 104a-n to enable the video presentation applications 106 to update the video enhancement overlays to include the updated event information. In one or more embodiments, the video presentation system 112 provides an update that includes all of the event information (including the changed event information). Alternatively, in one or more embodiments, the video presentation system 112 only provides any event information that has changed.

In addition, while one or more embodiments described herein relate specifically to providing an enhanced live video presentation for display on viewer client devices 104a-n, the video presentation system 112 can similarly communicate information over the network 116 to enable the first broadcasting device 102a (and one or more additional broadcasting devices 102a-n) to display the video enhancement overlay in conjunction with the live video stream. For example, in one or more embodiments, the video presentation system 112 enables the first broadcasting device 102a to display the video enhancement overlay in conjunction with the live video stream as the live video stream is captured and displayed on the first broadcasting device 102a. Thus, in one or more embodiments, the enhanced live video presentation appears on the first broadcasting client device 102a similar to how the presentation appears on the viewer client devices 104a-n.

Moreover, while one or more embodiments described herein include providing an enhanced live video presentation by providing the video enhancement overlay including a populated video overlay template to the broadcasting client device 102a and the viewer client devices 104a-n, in one or more embodiments, the video presentation system 112 provides the video enhancement overlay to the broadcasting client device 102a and viewer client devices 104a-n by providing information to the respective client devices 102a, 104a-n to enable the client devices 102a, 104a-n to generate and provide a display of the enhanced live video presentation. For example, as mentioned above, in one or more embodiments, the video presentation system 112 simply provides event information and an identification of a video overlay template to enable the client devices 102a, 104a-n to locally access a video overlay template and enhance a live video stream by displaying, in conjunction with the live video stream, a populated video overlay template including the live event information.

Moving onto FIGS. 2A-6B, additional features will be described with regard to example user interfaces that illustrate features and functionality of the video presentation system 112. For example, as shown in FIGS. 2A-6B, a mobile client device 202 including a touch screen display 204 provides a graphical user interface 206 (or simply "GUI 206") that includes a presentation of a live video stream. In particular, each of FIGS. 2A-6B illustrate a presentation of the live video stream as it appears on either a broadcasting client device or a viewer client device. Thus, unless specifically indicated otherwise, features and functionality described in connection with a presentation of a live video stream displayed by the mobile client device 202 can apply similarly to providing a presentation of a live video stream on either a broadcasting client device or a viewer client device.

As shown in FIG. 2A, the GUI 206 includes a live video stream display 208 including live video content captured by a broadcasting client device. For example, in one or more embodiments, the GUI 206 includes the live video stream display 208 including live video content captured by a camera of the mobile client device 202 (or if the mobile client device 202 is a viewer client device, the live video stream display includes video content captured by a camera of another mobile device). As further shown in FIG. 2A, the GUI 206 includes various indicators provided in conjunction with the live video stream display 208. For example, as shown in FIG. 2A, the GUI 206 includes a live indicator 210 that indicates to a user of the mobile client device 202 that the video presentation system 112 has made the live video stream available to one or more users of the communication system. In addition, as shown in FIG. 2A, the GUI 206 includes a viewer indicator 212, which informs the user of the mobile device 202 (the broadcaster and/or viewer) about a number of viewer client devices currently receiving the live video stream.

As shown in FIG. 2A, the GUI 206 further includes a live toolbar 214 including selectable options for enhancing or otherwise modifying a presentation of the live video stream display 208. For example, as shown in FIG. 2A, the live toolbar 214 includes a filter control 216, a drawing control 218, and an overlay control 220. In particular, the filter control 216 facilitates applying one or more filters to the live video stream display 208. Further, the drawing control 218 enables a broadcaster to manually draw or doodle over a portion of the live video stream display 208. In addition, and as will be described in further detail herein, the overlay control 220 facilitates providing a video enhancement overlay in conjunction with the live video stream display 208. In one or more embodiments, the live toolbar 214 includes other controls that enable a broadcaster to interact with the GUI 206 and cause the video presentation system 112 to modify the presentation of the live video stream display 208 as it appears on broadcasting and/or viewer client devices.

As further shown in FIG. 2, the GUI 206 includes a plurality of event indicators 222a-b and a create event indicator 223. In one or more embodiments, the mobile client device 202 provides the event indicators 222a-b and the create event indicator 223 upon detecting a user selection of the overlay control 220. In particular, in the case that the mobile client device 202 refers to a broadcasting client device, the video presentation system 112 causes the mobile client device 202 to display the event indicators 222a-b and the create event indicator based on a location of the mobile client device 202 capturing the live video content.

Each of the event indicators 222a-b correspond to respective events (e.g., previously created events) associated with a location of the mobile client device 202 and/or a time at which the mobile client device 202 captures the live video stream. For example, the first event indicator 222a refers to a National Basketball Association (NBA) game between the Golden State Warriors (herein after "Warriors") and the Oklahoma City Thunder (herein after "Thunder") taking place at a sporting arena in Oklahoma City, Okla. As another example, the second event indicator 222b refers to an Election Day party taking place at one or more locations within the country of the user of the mobile client device 202.

In one or more embodiments, the listing or presentation of the event indicators 222a-c includes a list of event indicators in accordance with a ranking of events. For example, in one or more embodiments, the video presentation system 112 ranks events based on a number of broadcasting client devices capturing live video content at locations of the events. In one or more embodiments, the video presentation system 112 ranks the events based on a combination of location relative to the mobile client device 202 and a number of broadcasting client devices capturing live video while at the events.

In one or more embodiments, the video presentation system 112 provides one or more of the event indicators 222a-b for previously created events based on previously receiving a request to create the events. For example, with regard to the NBA game event, the video presentation system 112 may create the NBA game event based on receiving a request from any broadcaster at the NBA game that is capturing live video content while at the NBA game and within a time window associated with a duration of the NBA game.

Alternatively, in one or more embodiments, the video presentation system 112 creates the event of the NBA game based on receiving a request from a user of another entity to create the event of the NBA game event (e.g., without requiring that the user broadcast live video content while at the event). For example, the NBA or other organization may coordinate with the communication system to facilitate creation of the NBA game event that enables any broadcasting client device to associate a live video stream with the NBA game event.

As an alternative to receiving a user request to create the NBA game event, in one or more embodiments, the video presentation system 112 creates the NBA game event (or any other event) based on a detected number of live video streams originating from broadcasting client devices located at the event. As an example, upon detecting a predetermined number of live video streams broadcasting from the same location, the video presentation system 112 can create an event for the location and enable broadcasters of the predetermined number of live video streams and any subsequent broadcasters to associate the live video streams with the created event.

In addition, in some embodiments, upon detecting a location of a live video stream, the video presentation system 112 can search for an event associated with the location of the live video stream. For example, in one or more embodiments, the video presentation system 112 identifies any number of created events having a location within a predetermined radius of the location of the live video stream. In one or more embodiments, the video presentation system 112 identifies only public events (e.g., created events designated as public) within a particular radius of the location of the live video stream.

In one or more embodiments, the video presentation system 112 gathers information about the time and/or location to determine the type of event (e.g., NBA game, election party) from various sources. For example, the video presentation system 112 can receive information about the created event from users of the communication system, a third party server device 114, any of the broadcasters at the event, or other source(s). For example, a third party server device 114 may provide a list of events associated with event types to the video presentation system 112, and in response, the video presentation system 112 can generate an event associated with a particular time and location to provide to a broadcasting client device upon detecting a live video stream originating from the broadcasting client device at the location and during the time associated with the event.

As shown in FIG. 2A, the first event indicator 222a associated with the NBA game refers to an event at a specific time (e.g., within a specific time window) and a specific location (e.g., within a defined radius of the mobile client device 202a). Further, while the second event indicator 222b may similarly refer to an event associated with a time and a defined location, in one or more embodiments, the video presentation system 112 can create one or more events unrestricted (or less restricted) by time and/or location.

For example, where an election party event associated with the second event indicator 222b has a potential interest of broadcasters from multiple locations, the video presentation system 112 can create one or more events having a specific time while also having a broad location range (e.g., rather than a location-specific event such as an NBA game). For example, the election party event may include a specific time window corresponding to a date of an election, however, the election party event does not include a specific location. Thus, as shown in FIG. 2A, the second event indicator 222b may refer to an election party event having no location boundary (e.g., including any users of the communication system) or simply having a large location boundary (e.g., anywhere within the United States). In this way, broadcasters can participate in the same election party event at locations across the country.

In addition to creating an event that is associated with a specific time and an unrestricted location, the video presentation system 112 can create an event associated with an unrestricted time and a specific location. For example, an event can be associated with a location of Old Faithful Geyser in Yellowstone National Park, but the event can have an unrestricted time definition. Thus, upon detecting a live video stream originating from a location associated with Old Faithful Geyser, the video presentation system 112 can provide the broadcasting client device 202 an event indicator associated with Old Faithful Geyser.

While not shown in FIG. 2A, in one or more embodiments, the video presentation system 112 enables a user of the mobile client device 202 to search for one or more events. For example, the video presentation system 112 can enable a user of the mobile client device 202 to search events by location, name, or other criteria in an effort to join a previously created event that the video presentation system 112 may not otherwise automatically detect and provide via the GUI 206 of the mobile client device 202.

As mentioned above, and as shown in FIG. 2A, the GUI 206 further includes a create event indicator 223 that enables the user of the mobile client device 202 to create a new event associated with the live video content captured by the mobile client device 202. In particular, upon detecting a selection of the create event indicator 223, the video presentation system 112 creates a new event for the live video stream displayed by the mobile client device 202. The user can further select one or more options to modify the name or details associated with the new event via options provided by the mobile client device 202. Additional details with regard to creating an event in response to detecting a user selection of the create event indicator 223 are described in further detail in connection with FIGS. 6A-6B below.

In response to a user of the mobile client device 202 selecting the first event indicator 222a associated with the NBA game, the video presentation system 112 provides one or more template indicators. A template indicator is a selectable graphical element that provides information about one or more characteristics of a video overlay template. For example, as shown in FIG. 2B, the GUI 206 includes a plurality of template indicators 224a-d corresponding to video overlay templates that the video presentation system 112 may use to generate a video enhancement overlay that enhances a presentation of the live video stream display 208.

In one or more embodiments, the video presentation system 112 enables a user of the mobile client device 202 to select one of the template indicators 224a-d to use for generating the video enhancement overlay to display in conjunction with the live video stream display 208.

As mentioned above, the video presentation system 112 gathers or otherwise receives event information. For example, in response to detecting a selection of the first event indicator 222a associated with the NBA game, the video presentation system 112 can gather information about the NBA game to include within fields of a corresponding video overlay template. For example, as mentioned above, the video presentation system 112 can gather discrete portions of the event information including, for example, a current score, a current period (e.g., fourth quarter), a duration of time (e.g., time left in the quarter, time left in the event), or any other dynamic information associated with the identified event. As will be described in further detail below, the video presentation system 112 can include the received event information within respective fields of a video overlay template to generate a video enhancement overlay.

As shown in FIG. 2B, each of the template indicators 224a-d include field icons 225 that illustrate an appearance of a corresponding video enhancement overlay (e.g., a video overlay template including populated fields). Although the reference numeral 225 of FIG. 2B indicates example field icons with specific respect to template indicators 224b and 224c, it is appreciated that the icons included within each of the template indicators 224a-d represent various types of field icons. In particular, as will be described in further detail below with regard to FIGS. 3A-3D, each of the field icons 225 correspond to respective fields of video overlay templates that correspond to the displayed template indicators 224a-d. For example, as will be described below in connection with FIGS. 3A-3D, the first template indicator 224a corresponds to a video overlay template used to construct the first video enhancement overlay 301a shown in FIG. 3A. The second template indicator 224b corresponds to a video overlay template used to construct the second video enhancement overlay 301b shown in FIG. 3B. The third template indicator 224c corresponds to a video overlay template used to construct the third video enhancement overlay 301c shown in FIG. 3C. The fourth template indicator 224d corresponds to a video overlay template used to construct the fourth video enhancement overlay 301d shown in FIG. 3D.

Moving onto FIGS. 3A-3D, FIG. 3A illustrates an example video enhancement overlay constructed from a video overlay template corresponding to the first template indicator 224a (FIG. 2B). In particular, FIG. 3A illustrates a first enhancement overlay 301a including fields dedicated to scores of the teams and a current period of the selected event (the NBA basketball game). For example, as shown in FIG. 3A, a first score field 302a corresponds to a score of a visiting team (Warriors) while a second score field 304a corresponds to a score of a home team (Thunder). As further shown, the first enhancement overlay 301a includes a quarter field 306a corresponding to a current period (4$^{th}$ quarter) of the sporting event.

FIG. 3B illustrates another example video enhancement overlay constructed from a video overlay template corresponding to the second template indicator 224b. In particular, FIG. 3B illustrates a second enhancement overlay 301b including fields dedicated to scores of the teams and a current period of the selected event. For example, as shown in FIG. 3B, the first score field 302b corresponds to the score of the visiting team while the second score field 304b corresponds to the score of the home team. Similar to FIG. 3A, the second enhancement overlay 301b further includes a quarter field 306b indicating that the event has progressed to the fourth quarter of the basketball game.

FIG. 3C illustrates another example video enhancement overlay constructed from a video overlay template corresponding to the third template indicator 224c. In particular, FIG. 3C illustrates a third enhancement overlay 301c including fields dedicated to scores of the teams. For example, similar to FIGS. 3A and 3B, the third enhancement overlay 301c includes a first score field 302c corresponding to the score of the visiting team while the second score field 304c corresponds to the score of the home team. In contrast to the first and second enhancement overlays 301a-b, however, the third enhancement overlay 301c does not include a field dedicated to the current period or quarter of the event.

FIG. 3D illustrates another example video enhancement overlay constructed from a video overlay template corresponding to the fourth template indicator 224d. In particular, FIG. 3D illustrates a fourth enhancement overlay 301d including fields dedicated to scores of the teams, a current quarter of the event, and a duration of time left in the quarter (or time remaining in the event). For example, similar to FIGS. 3A-3C, the fourth enhancement overlay 301d includes a first score field 302d corresponding to the score of the visiting team while the second score field 304d corresponds to the score of the home team. In addition, and in contrast to FIGS. 3A-3C, the fourth enhancement overlay 301d includes a quarter field 306d indicating a current quarter of the event and a duration field 308d indicating a period of time left in the current quarter of the event.

Further, as shown in FIG. 3D, the fourth enhancement overlay 301d includes a dynamic scrolling element including additional event information. In particular, as shown in FIG. 3D, the fourth enhancement overlay 301d includes a scrolling stat bar that includes statistics of individual players of the basketball game. In one or more embodiments, the scrolling stat bar includes statistics of those identified as statistical leaders of the event, statistics of any players actively participating in the event (e.g., players on the court), or any of the players in the game. In one or more embodiments, the scrolling stat bar includes information about other related events (e.g., other games from other NBA games happening at the same time).

In one or more embodiments, the video presentation system 112 generates one of the video enhancement overlays 301a-d in response to detecting a selection of the corresponding template indicator 224a-d. In particular, in response to detecting the selection of a template indicator, the video presentation system 112 identifies a corresponding video overlay template and generates the video enhancement overlay by populating the fields of the identified video overlay template with discrete portions of event information. Upon generating the video enhancement overlay, the video presentation system 112 provides the video enhancement overlay to be displayed in connection with the live video stream display 208 via the mobile client device 202.

In one or more embodiments, the video presentation system 112 updates the video enhancement overlay based on changing or otherwise dynamic event information. In particular, upon detecting a change in event information corresponding to one of the fields, the video presentation system 112 can update the event information currently displayed within the video enhancement overlay. In one or more embodiments, the video presentation system 112 updates the event information by generating an updated video enhancement overlay that replaces the currently displayed video enhancement overlay on the mobile client device 202. Alternatively, in one or more embodiments, the video presentation system 112 provides the updated event information to the mobile client device 202 to enable the mobile client device 202 (e.g., via the video presentation application 106) to update the displayed event information within the same video enhancement overlay.

For example, if a team scores one or more points, the video presentation system 112 provides an updated score for one or both of the teams. As another example, the video presentation system 112 can provide counter or timing information associated with the current period (e.g., quarter) or duration of time left in the sporting event. In one or more embodiments, the video presentation system 112 provides the updated information within each of the respective dedicated fields of the video enhancement overlay.

In one or more embodiments, the video presentation system 112 synchronizes content displayed via the video enhancement overlay and event information. For example, where a delay exists between capturing the live video stream and providing a display of the live video stream to viewers, in one or more embodiments, the video presentation system 112 may prevent display of the event information prior to a viewer seeing the live video content. In one or more embodiments, the video presentation system 112 synchronizes the displayed video content with the event information by tracking timestamp data associated with the live video stream and received event information. The video presentation system 112 may prevent sending event information having an earlier timestamp than captured video content until after the captured video content has been delivered to the viewer client devices 104a-n. In this way, the video presentation system 112 prevents updating information displayed within the video enhancement overlay prior to delivering corresponding live video content.

In one or more embodiments, the presentation of the live video stream display 208 and the video enhancement overlay includes the displayed event information at a fixed position over a portion of the live video stream. For example, any broadcaster or viewer of the live video stream will see the event information displayed over a portion of the live video stream display 208. Alternatively, in one or more embodiments, the video presentation system 112 causes some or all of the event information to be displayed at defined intervals or upon detecting a change in one or more portions of the event information. For example, upon detecting a change in the score, the video presentation system 112 can cause the mobile client device 202 to provide a display of the modified score for a short period of time and then cause the mobile client device 202 remove the score to provide an unobstructed view of the live video stream display 208. Thus, in one or more embodiments, the video enhancement overlay may include fields that appear and disappear as event information associated with the respective fields changes.

In addition, in one or more embodiments, the video presentation system 112 enables a broadcaster or viewer to modify the video enhancement overlay on a respective client device (or across all viewer client devices). For example, in one or more embodiments, the broadcaster can select or indicate a specific field to be added or removed from the video enhancement overlay. For instance, the broadcaster can select an option to remove the quarter field from the video enhancement overlay for all viewer devices. As an alternative, in one or more embodiments, the viewer can select an option to remove or add a specific field from the video enhancement overlay for the respective viewer client device. In response, the video presentation system 112 can provide a modified presentation specific to the viewer client device.

Furthermore, in one or more embodiments, the video presentation system 112 enables the broadcaster and/or viewer to scroll through the video enhancement overlays. For example, referring to FIGS. 3A-3D, the broadcaster can select a display option or perform a touch gesture (e.g., swiping touch gesture) to scroll through the different video enhancement overlays shown in FIGS. 3A-3D. In response to detecting a switch between different video enhancement overlays, the video presentation system 112 can modify the video enhancement overlay provided to each viewer client device. In one or more embodiments, the video presentation system 112 immediately modifies the presentation of the live video stream to reflect a real-time display of the broadcasting client device. Alternatively, to avoid disrupting the presentation of the live video stream to all the viewer client devices, the video presentation system 112 can modify the presentation of the live video stream upon determining that the broadcasting device has settled on a specific video enhancement overlay for a defined period of time (e.g., 10 seconds).

As mentioned above, in one or more embodiments, the video presentation system 112 receives the event information from a variety of sources. For example, in one or more embodiments, the video presentation system 112 receives information about the NBA game from a third party server 114. For instance, the video presentation system 112 can periodically look up the score, time, and other information associated with the NBA game from a website or other source on the third party server 114. In addition or as an alternative, the video presentation system 112 can receive information from one or more broadcasting client devices or via information about the event accessible via the communication system.

Figure 4B:
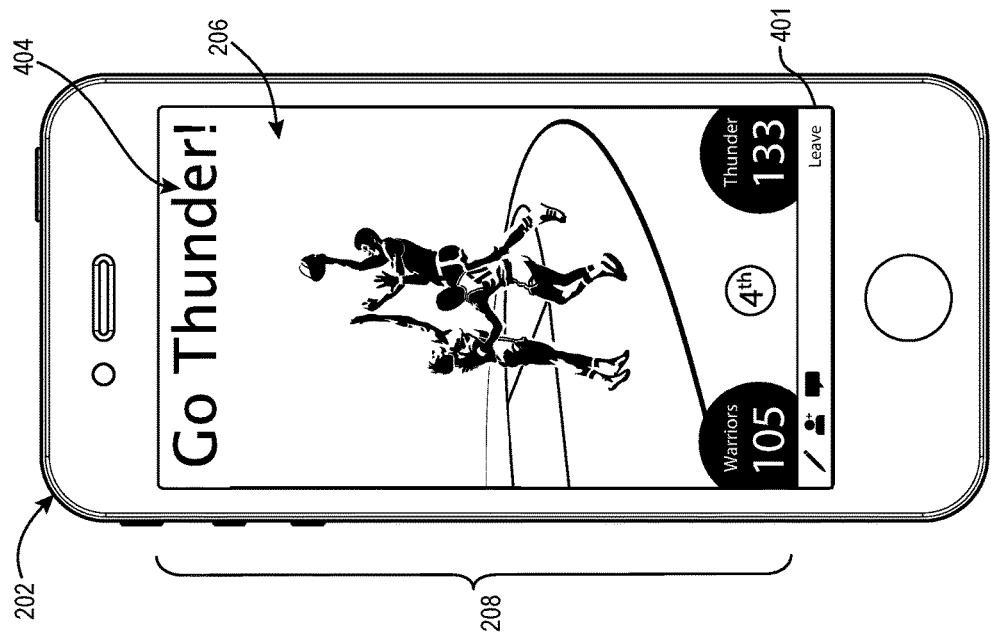
FIGS. 4A-4B illustrate example graphical user interfaces including enhanced live video presentations having customized graphics in accordance with one or more embodiments.
Figure 4A:
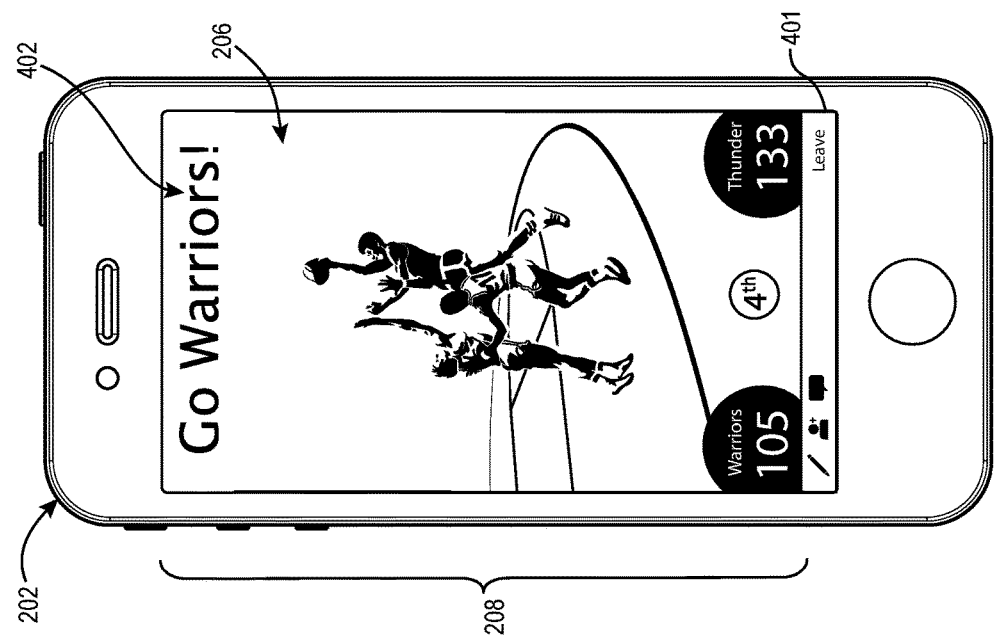

Moving onto FIGS. 4A-4B, FIG. 4A shows a mobile client device 202 including a touchscreen display 204, GUI 206, and live video stream display 208 similar to the example shown in FIG. 2A. As further shown, the GUI 206 includes a presentation of the live video stream that includes both the live video stream display 208 and a video enhancement overlay including similar fields 302a-306a described above in connection with FIG. 3A. As further shown, the GUI 206 includes a viewer toolbar 401 including one or more selectable options that enable a viewer (or broadcaster) to perform one or more actions (e.g., modify display, invite user, add comment, leave live video stream) with respect to the live video stream.

As further shown in FIG. 4A, the video enhancement overlay includes a first customized graphic 402 including text that reads "Go Warriors!" Alternatively, the video enhancement overlay can include a second customized graphic 404 including text that reads "Go Thunder!" In particular, in one or more embodiments, the video presentation system 112 includes a customized element within the video enhancement overlay based on a preference of the user of the mobile client device 202. For example, the video presentation system 112 can determine that the user of the mobile device 202 is a Warriors or a Thunder fan and provide the first customized graphic 402 or the second customized graphic 404 based on the determination about the user of the mobile device 202. As an alternative to providing a specific graphic, in one or more embodiments, the video presentation system 112 modifies a color of the enhanced live video presentation to reflect a particular theme (e.g., to include colors of one of the teams).

For example, in one or more embodiments, the video presentation system 112 determines or otherwise identifies information associated with the user of the mobile client device 202. Upon identifying the information about the user, the video presentation system 112 identifies a graphic corresponding to the information about the user (e.g., a favorable preference toward a sports team) and presents the graphic within a field of the video overlay template assigned to or otherwise designated as a field for displaying the identified graphic. As an alternative to the identified graphic, in one or more embodiments, the video presentation system 112 includes a portion of the information about the user of the mobile client device 202 within the field of the video overlay template when generating the video enhancement overlay. Thus, the enhanced live video presentation including both the live video stream display 208 and the video enhancement overlay can include both event information as well as a graphic or other information specific to the broadcaster (e.g., the user of the mobile client device 202).

The video presentation system 112 can receive or otherwise access the information about the user of the mobile client device from one or more sources. As an example, in one or more embodiments, the video presentation system 112 retrieves information about the user via the communication system. For example, where the broadcaster streams the live video content via a video presentation application 106, the video presentation system 112 can simply access profile information about the broadcaster to identify one or more preferences, ratings, likes, or other data about the broadcaster to include within a field of the video overlay template. For example, if a user has "liked" the Warriors via a social networking profile, the video presentation system 112 can cause the first customized graphic 402 to display within the video enhancement overlay. Alternatively, if the user has "liked" the Thunder via a social networking profile, the video presentation system 112 can cause the second customized graphic 404 to display within the video enhancement overlay. In one or more embodiments, the video presentation system 112 enables a broadcaster to select information or explicitly identify a customized graphic to display within the video enhancement overlay.

Figure 5B:
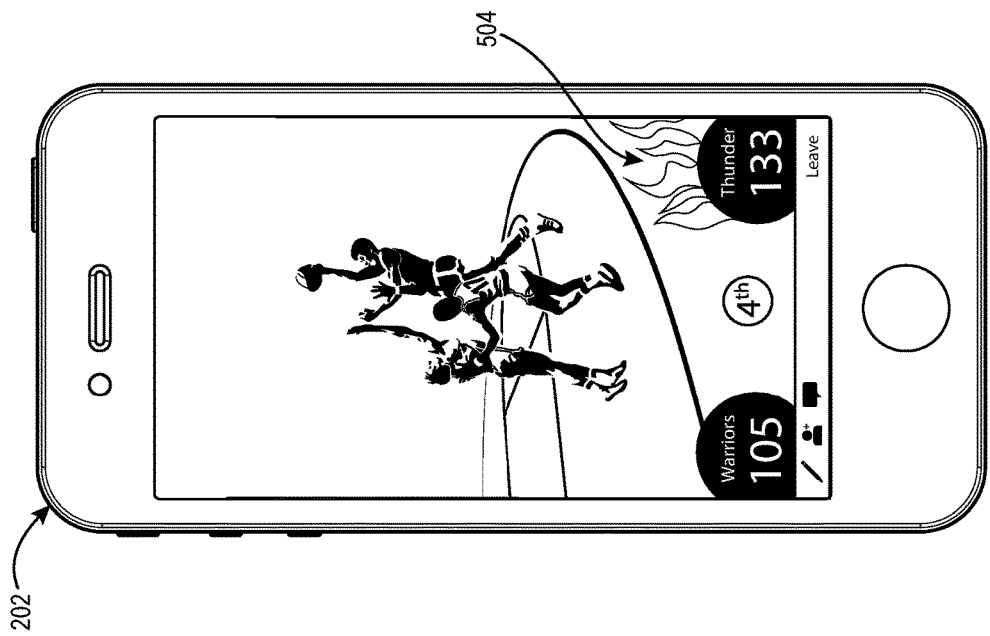
FIGS. 5A-5B illustrate example graphical user interfaces including enhanced live video presentations having customized animations in accordance with one or more embodiments.
Figure 5A:
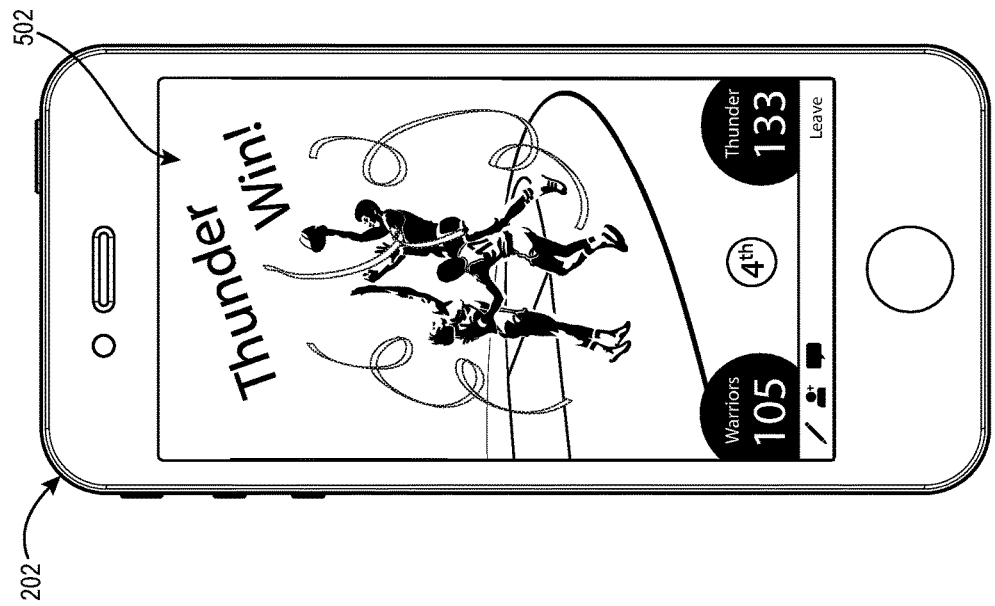

Moving onto FIGS. 5A-5B, the presentation of the live video stream can further include one or more animations associated with the event. For example, FIG. 5A illustrates a first animation 502 to indicate that the event has finished and that the Thunder won the basketball game. In particular, as shown in FIG. 5A, the video enhancement overlay includes an animation that includes streamers and text that reads "Thunder Win!" over a portion of the live video stream display 208. In addition, as shown in FIG. 5B, the enhanced live video presentation includes a second animation 504. For example, as shown in FIG. 5B, the second animation includes a fire animation around the second score field 304a.

In one or more embodiments, the video presentation system 112 generates the animation based on detecting a trigger condition associated with the event. For example, as shown in FIG. 5A, the video presentation system 112 causes the mobile client device 202 to display the first animation 502 upon determining that the basketball game has finished. In one or more embodiments, the video presentation system 112 generates the first animation 502 based on event information received from the third party server 114 indicating that the event has finished (e.g., the same information used when updating the fields 302a-306a described above in connection with FIGS. 3A-3D).

As an alternative to generating the first animation 502 based on received data from the third party server 114, the video presentation system 112 can generate the first animation 502 based on event information received via the communication system. For example, the video presentation system 112 may determine that the game finished and that the Thunder won the game based on comments made to the live video stream. Alternatively, in one or more embodiments, the video presentation system 112 determines that the game finished and that the Thunder won the game based on comments made generally to newsfeeds and/or user profiles on the communication system. In one or more embodiments, the video presentation system 112 generates the animation only if the video presentation system 112 identifies the broadcaster (or a respective viewer) as a fan of the winning team. Alternatively, the video presentation system 112 may provide a different animation based on information associated with the broadcaster and/or viewers.

As another example of modifying the enhanced live video presentation based on a detected trigger condition, with regard to FIG. 5B, the video presentation system 112 can receive information from the third party server device 114 that indicates the Thunder lead the Warriors by a threshold score (e.g., 20 points). In response, the video presentation system 112 generates the second animation and causes the mobile client device 202 to display the animation around the second score field 304a, as shown in FIG. 5B. The video presentation system 112 can display the similar animation under different trigger conditions. For example, the video presentation system 112 may generate and provide the second animation 504 for display upon detecting a number of points scored in a row for a specific team, detecting a total number of points scored for a team, detecting a successful three-point attempt, or a combination of multiple conditions associated with the event.

As another example, the video presentation system 112 generates or identifies the animation based on identifying a trigger condition from data received from multiple broadcasting devices capturing live video content while at the event. For example, while capturing the live video content, the mobile client device 202 can capture noise data, motion data, and other types of data via one or more sensors onboard the mobile client device 202. In one or more embodiments, the video presentation system 112 receives noise data, motion data, temperature data, or other types of data and generates the animation based on one or a combination of the data captured by the multiple broadcasting client devices. As an example, where multiple broadcasting client devices detect an elevated level of noise and/or motion data indicating a high level of excitement for the Thunder, the video presentation system 112 may update or otherwise modify the video enhancement overlay to include the second animation 504.

As mentioned above, as an alternative to joining a previously created event or otherwise associating a live video stream with a previously created event, the video presentation system 112 enables a user of the mobile client device 202 to generate a user event and associate the user event with a live video stream. For example, as described above in connection with FIG. 2A, the GUI 206 includes a create event indicator 223. Upon detecting a selection of the create event indicator, the video presentation system 112 can cause the mobile client device 202 to provide the GUI 206 shown in FIG. 6A.

In particular, as shown in FIG. 6A, the GUI 206 includes a live video stream display 208 including video content captured by the mobile client device 202 while the user of the mobile client device 202 takes a bike ride. As shown in FIG. 6A, the GUI 206 further includes template indicators

602, 604 corresponding to video overlay templates for the created user event. Similar to the template indicators 224*a-d*, the template indicators 602, 604 for the user event provide a visualization for how the video enhancement overlay will appear. In particular, each of the template indicators 602, 604 correspond to a respective video overlay template. In addition, as shown in FIG. 6A, the template indicators 602, 604 include one or more field icons 605 that indicate where different fields of the video overlay templates will appear within the enhanced live video presentation.

As shown in FIG. 6A, the user event refers to a bike ride of the user of the mobile client device 202. In one or more embodiments, the video presentation system 112 creates the "bike ride" user event based on received input from the user of the mobile client device 202 upon selecting the create event indicator 223 of FIG. 2A. For example, the video presentation system 112 can select one of a listing of common events such as, for example, a bike ride, a run, a hike, a picnic, a party, a sporting event, a rally, or any other event that a user of the mobile client device 202 may want to live stream.

Upon detecting a user selection of a type of event, the video presentation system 112 causes the mobile client device 202 to present one or more template indicators associated with video overlay templates that the video presentation system 112 may use for the selected type of event. As an example, upon detecting a user selection of a "bike ride" user event, the video presentation system 112 provides the template indicators 602, 604 shown in FIG. 6A. Further, in response to detecting a selection of one of the template indicators 602, 604, the video presentation system 112 identifies a video overlay template including fields to populate with information about the bike ride.

For example, in response to detecting a user selection of the first template indicator 602, the video presentation system 112 causes the mobile device 202 to display the enhanced live video presentation shown in FIG. 6B. As shown in FIG. 6B, the GUI 206 includes the live video stream display 208 and the video enhancement overlay corresponding to the first selected template indicator 602. As shown in FIG. 6B, the video enhancement overlay includes displayed event information about the event within fields of the identified video overlay template. For example, as shown in FIG. 6B, the GUI 206 includes a map field 606 including a map of a bike path, a temperature field 608 indicating a detected temperature, a speed field 610 indicating a current speed of the mobile client device 202, and a heart rate field 612 indicating a detected heart rate of the user of the mobile client device 202.

In one or more embodiments, the information used to populate the fields of the selected video overlay template originates from multiple sources. For example, in one or more embodiments, the video presentation system 112 receives map information associated with a location of the mobile client device 202 from a third party server device 114 while streaming the live video content. In addition, as shown in FIG. 6B, the map field 606 includes a current position indicator 607 that shows a current position of the mobile client device 202 based on a detected GPS location (e.g., from a GPS sensor on the mobile client device 202). In this way, viewers of the enhanced live video presentation can see a current position of the broadcaster.

As a further example, in one or more embodiments, the enhanced live video presentation includes temperature information included within the temperature field 608. In one or more embodiments, the video presentation system 112 receives the temperature information from a temperature sensor on the mobile client device 202. In one or more embodiments, the mobile client device 202 provides detected temperature information to the video presentation system 112 to be used in populating the temperature field 608 of the video enhancement overlay. Alternatively, in one or more embodiments, the mobile client device 202 populates a field of the video overlay template designated for temperature information locally on the mobile client device 202 without sending the detected temperature information to the video presentation system 112. In one or more embodiments, the video presentation system 112 receives the temperature information from an alternative source such as, for example, the third party server 114.

As another example, in one or more embodiments, the enhanced live video presentation includes speed information included within the speed field 610. Similar to the temperature information, in one or more embodiments, the video presentation system 112 receives the speed information via onboard sensors of the mobile client device 202. Alternatively, in one or more embodiments, the mobile client device 202 locally populates the speed field 610 of a video overlay template using locally detected speed data.

As another example, in one or more embodiments, the enhanced live video presentation includes heart rate information included within the heart rate field 612. In addition, similar to one or more embodiments herein, the mobile client device 202 can populate the heart rate field 612 locally or, alternatively, provide the heart rate information to the video presentation system 112 to populate the heart rate field 612 of the video overlay template. In one or more embodiments, the mobile client device 202 receives the heart rate information from a nearby electronic device (e.g., a smart watch, heart rate detector) that wirelessly transmits, shares, or otherwise provides the heart rate information to the mobile client device 202.

Figure 7:
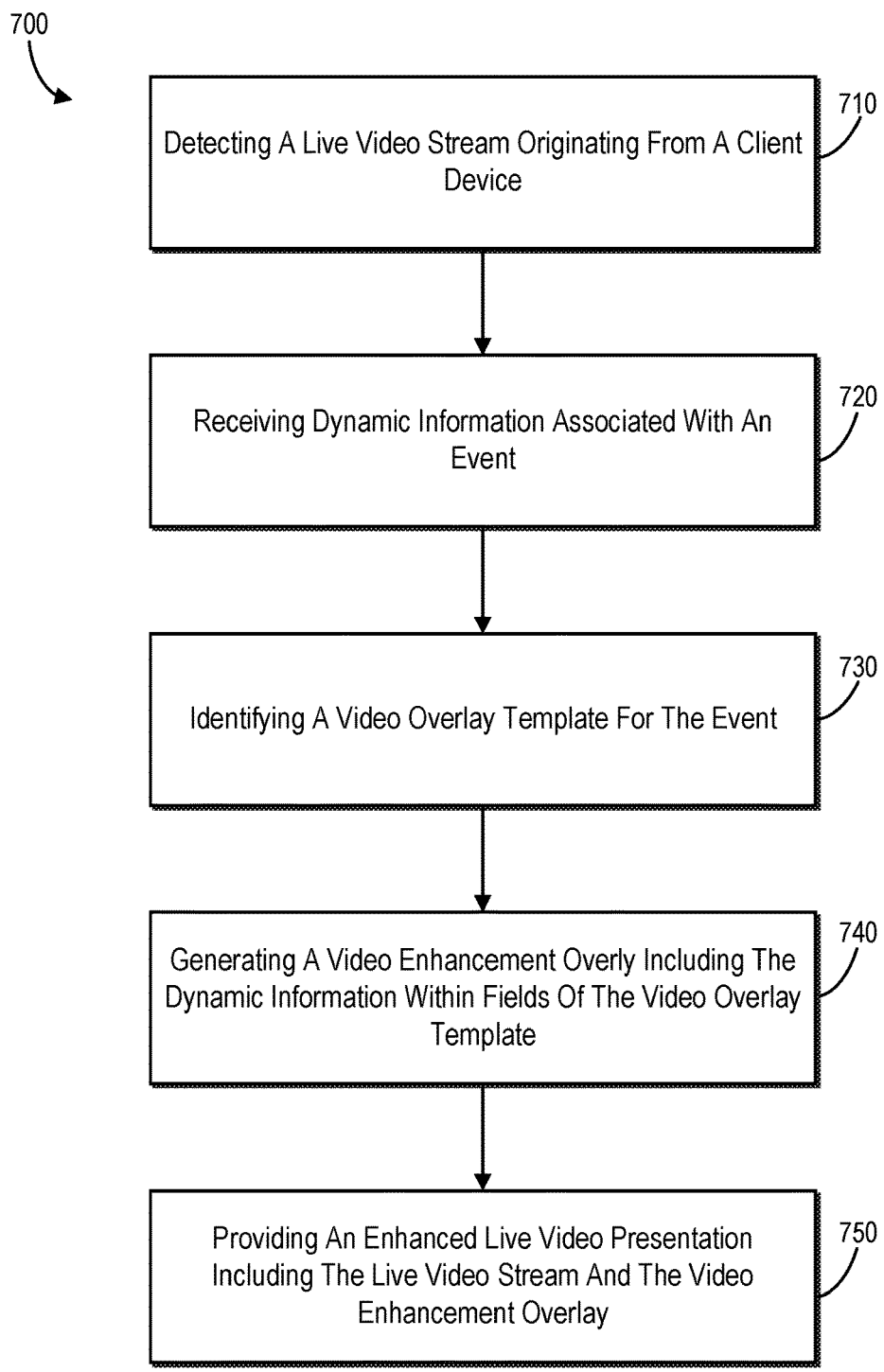
FIG. 7 illustrates a flow diagram of a method for providing an enhanced live video presentation in accordance with one or more embodiments.

FIGS. 1-6B, the corresponding text, and the examples, provide a number of different systems and devices that enable a video presentation system 112 to provide an enhanced live video presentation including live video content and a video enhancement overlay. In addition to the foregoing, embodiments can also be described in terms of flowcharts comprising acts in a method for accomplishing a particular result. For example, FIG. 7 illustrates a flowchart of an exemplary method in accordance with one or more embodiments. In particular, the video presentation system 112 performs the various acts of FIG. 7 based on at least one processor executing instructions that cause the video presentation system 112 to perform the acts.

FIG. 7 illustrates a flowchart of one example method 700 for providing an enhanced live video presentation including a live video stream and a video enhancement overlay including event information associated with a location of a client device (e.g., first broadcasting client device 102*a*) capturing the live video stream. As shown in FIG. 7, the method 700 includes an act 710 of detecting a live video stream originating from a client device. For example, in one or more embodiments, the act 710 involves detecting, at a server device (e.g., server device 108), a live video stream originating from a client device located at an event.

In one or more embodiments, the method 700 includes generating or otherwise identifying the event. For example, in one or more embodiments, the method 700 involves identifying the event from a plurality of previously created events based on a time of origination of the live video stream and a location of the client device while capturing the live video stream. For example, where a broadcaster previously creates an event, identifying the event may involve identifying the previously created event and associating the live video stream with the previously created event.

As another example of generating or identifying the event, the method 700 can include detecting, at the server device, a plurality of live video streams originating from a plurality of client devices at a location. In addition, the method 700 can include creating the event based on a number of the plurality of live video streams originating from the plurality of client devices while at the location. As another example, in one or more embodiments, the method 700 includes receiving, from the client device, a request to create the event associated with a time and location of the client device. In addition, the method 700 can include creating the event in response to receiving the request.

As shown in FIG. 7 the method 700 further includes an act 720 of receiving dynamic information associated with the event. For example, in one or more embodiments, receiving the dynamic information involves receiving information associated with the event from a third party server device 114. As another example, in one or more embodiments, receiving the dynamic information involves receiving information from one or more sensors of the client device. As a further example, in one or more embodiments, receiving the dynamic information associated with the event involves receiving information from a plurality of client devices capturing a plurality of live video streams at the event.

In addition, the dynamic information can include various types of information. As a first example, in one or more embodiments, the dynamic information includes information about a sporting event including a score of the sporting event and a duration of time associated with the sporting event. As another example, in one or more embodiments, the dynamic information includes a current location of the client device and a detected speed if the client device. As a further example, in one or more embodiments, the dynamic information includes a determined noise level of the event and detected motion data of a plurality of client devices.

As shown in FIG. 7, the method 700 further includes an act 730 of identifying a video overlay template for the event. For example, in one or more embodiments, the act 730 involves identifying a video overlay template for the event that includes one or more fields corresponding to discrete portions of the dynamic information associated with the event. In one or more embodiments, identifying the video overlay template involves providing a plurality of template indicators corresponding to a plurality of video overlay templates. In addition, identifying the video overlay template can involve receiving, from the client device, a user selection of a template indicator of the plurality of template indicators corresponding to the video overlay template for the event. In one or more embodiments, providing the plurality of template indicators includes identifying a plurality of templates having one or more fields corresponding to discrete portions of the dynamic information associated with the event.

As shown in FIG. 7, the method 700 further includes an act 740 of generating a video enhancement overlay including the dynamic information within fields of the video overlay template. For example, in one or more embodiments, the act 740 includes generating a video enhancement overlay for the live video stream where the video enhancement overlay includes portions of the received dynamic information within the one or more fields of the video overlay template. In one or more embodiments, generating the video enhancement overlay involves populating designated the fields (e.g., designated fields) of the video overlay template with portions of the dynamic information (e.g., corresponding to the designated fields).

As shown in FIG. 7, the method 700 further includes an act 750 of providing an enhanced live video presentation including the live video stream and the video enhancement overlay. For example, in one or more embodiments, the act 750 involves providing, for display to a user associated with a second client device (e.g., a first viewer client device 104a), the live video stream and the video enhancement overlay. In one or more embodiments, providing the live video stream and the video enhancement overlay involves providing the live video stream and the video enhancement overlay to be displayed on any number of client devices (e.g., viewer client devices 104a-n).

In one or more embodiments, the method 700 further includes detecting a trigger condition of the event based on the received dynamic information. In addition, in one or more embodiments, the method 700 includes providing, for display to the user associated with the second client device and in conjunction with the live video stream and the video enhancement overlay, an animation associated with the trigger condition of the event.

Moreover, in one or more embodiments, the method 700 further includes identifying information associated with a user of the client device located at the event. In addition, in one or more embodiments, the method 700 includes providing, for display to the user associated with the second client device and in conjunction with the live video stream and the video enhancement overlay, a graphic associated with the event and the identified information associated with the user of the client device.

Figure 8:
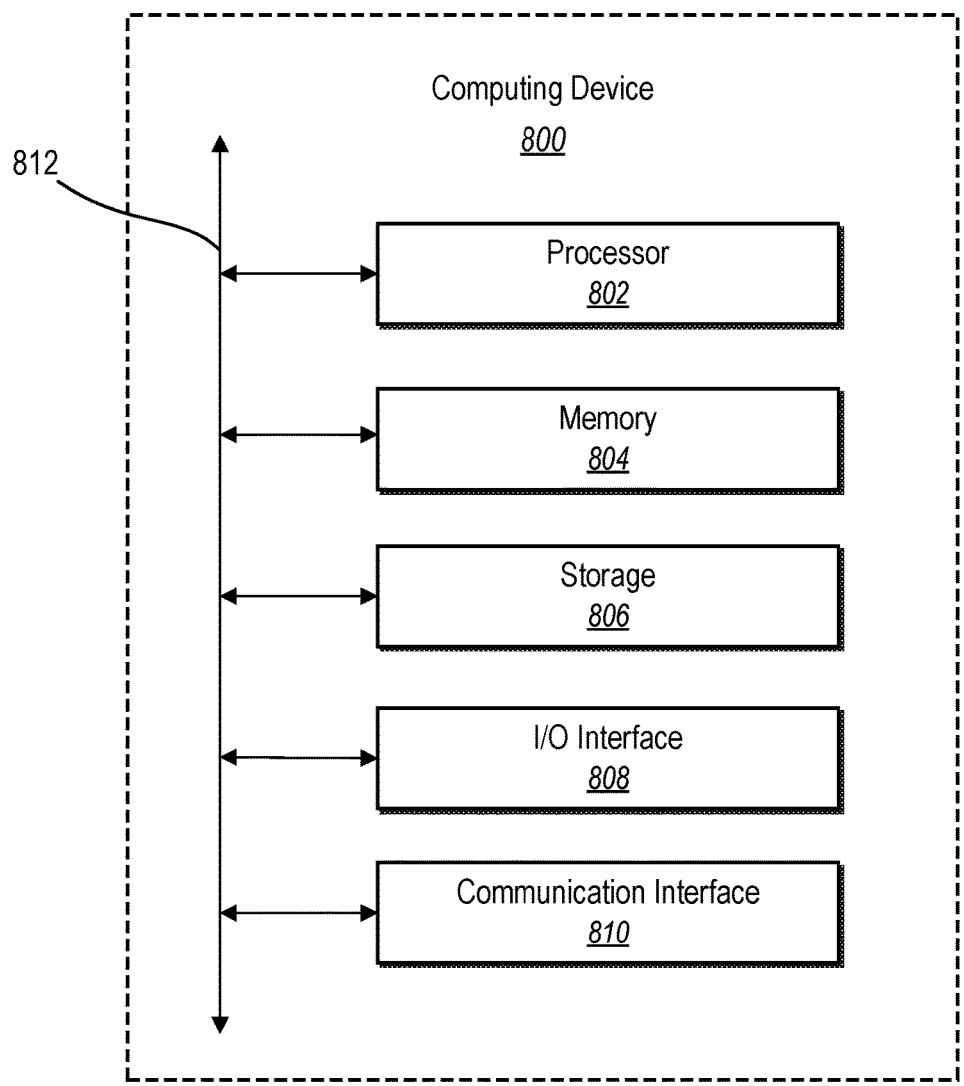
FIG. 8 illustrates a block diagram of an example computing device in accordance with one or more embodiments.

FIG. 8 illustrates, in block diagram form, an exemplary computing device 800 that may be configured to perform one or more of the processes described above. In one or more embodiments, the broadcasting client devices 102a-n, viewer client devices 104a-n, server device 108, and third party server device 114 each comprise one or more computing devices in accordance with implementations of computing device 800. As shown by FIG. 8, the computing device can comprise a processor 802, a memory 804, a storage device 806, an I/O interface 808, and a communication interface 810, which may be communicatively coupled by way of communication infrastructure 812. While an exemplary computing device 800 is shown in FIG. 8, the components illustrated in FIG. 8 are not intended to be limiting. Additional or alternative components may be used in other embodiments. Furthermore, in certain embodiments, a computing device 800 can include fewer components than those shown in FIG. 8. Components of computing device 800 shown in FIG. 8 will now be described in additional detail.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage device 806 and decode and execute them. In particular embodiments, processor 802 may include one or more internal caches for data, instructions, or addresses. As an example and not by way of limitation, processor 802 may include one or more instruction caches, one or more data caches, and one or more translation lookaside buffers (TLBs). Instructions in the instruction caches may be copies of instructions in memory 804 or storage 806.

Memory 804 may be used for storing data, metadata, and programs for execution by the processor(s). Memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 804 may be internal or distributed memory.

Storage device 806 includes storage for storing data or instructions. As an example and not by way of limitation, storage device 806 can comprise a non-transitory storage medium described above. Storage device 806 may include a hard disk drive (HDD), a floppy disk drive, flash memory, an optical disc, a magneto-optical disc, magnetic tape, or a Universal Serial Bus (USB) drive or a combination of two or more of these. Storage device 806 may include removable or non-removable (or fixed) media, where appropriate. Storage device 806 may be internal or external to the computing device 800. In particular embodiments, storage device 806 is non-volatile, solid-state memory. In other embodiments, Storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 808 allows a user to provide input to, receive output from, and otherwise transfer data to and receive data from computing device 800. I/O interface 808 may include a mouse, a keypad or a keyboard, a touch screen, a camera, an optical scanner, network interface, modem, other known I/O devices or a combination of such I/O interfaces. I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 808 is configured to provide graphical data to a display for presentation to a user. The graphical data may be representative of one or more graphical user interfaces and/or any other graphical content as may serve a particular implementation.

Communication interface 810 can include hardware, software, or both. In any event, communication interface 810 can provide one or more interfaces for communication (such as, for example, packet-based communication) between computing device 800 and one or more other computing devices or networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Communication infrastructure 812 may include hardware, software, or both that couples components of computing device 800 to each other. As an example and not by way of limitation, communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the communication system 110 may be linked to and/or implemented within a social-networking system (e.g., a social networking system). A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in to a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similar to events, the calendar entries may include times, dates, locations and identities of other users.

Figure 9:
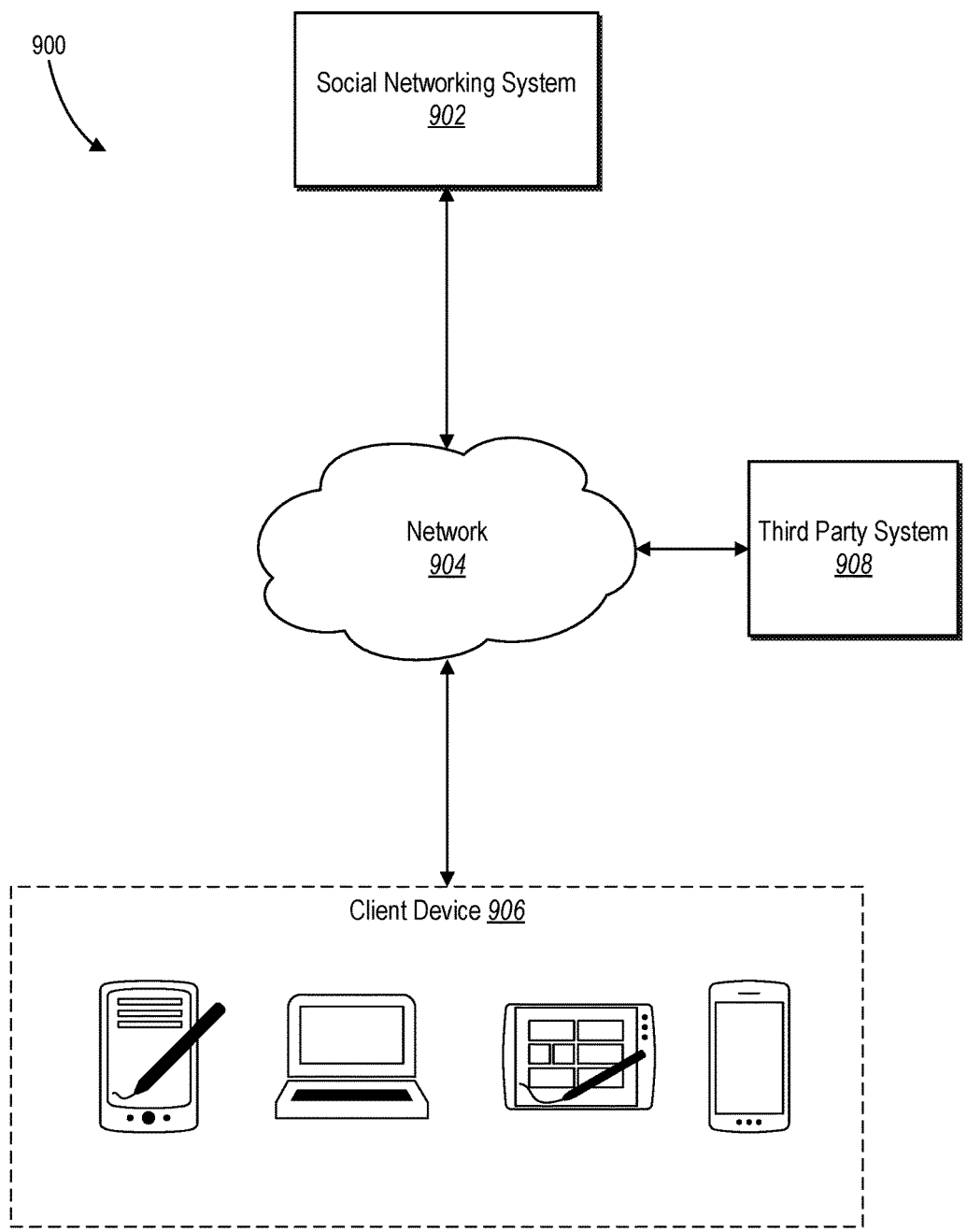
FIG. 9 illustrates an example network environment of a social networking system in accordance with one or more embodiments.

FIG. 9 illustrates an example network environment 900 of a social-networking system. In particular embodiments, a social-networking system 902 may comprise one or more data stores. In particular embodiments, the social-networking system 902 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system 902 may comprise one or more computing devices (e.g., servers) hosting functionality directed to operation of the social-networking system 902. A user of the social-networking system 902 may access the social-networking system 902 using a client device such as client device 906. In particular embodiments, the client device 906 can interact with the social-networking system 902 through a network 904.

The client device 906 may be a desktop computer, a laptop computer, a tablet computer, a personal digital assistant (PDA), an in- or out-of-car navigation system, a smart phone or other cellular or mobile phone, or a mobile gaming device, other mobile device, or other suitable computing devices. Client device 906 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 904.

Network 904 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 906 may access the social-networking system 902.

While these methods, systems, and user interfaces utilize both publicly available information as well as information provided by users of the social-networking system, all use of such information is to be explicitly subject to all privacy settings of the involved users and the privacy policy of the social-networking system as a whole.

Figure 10:
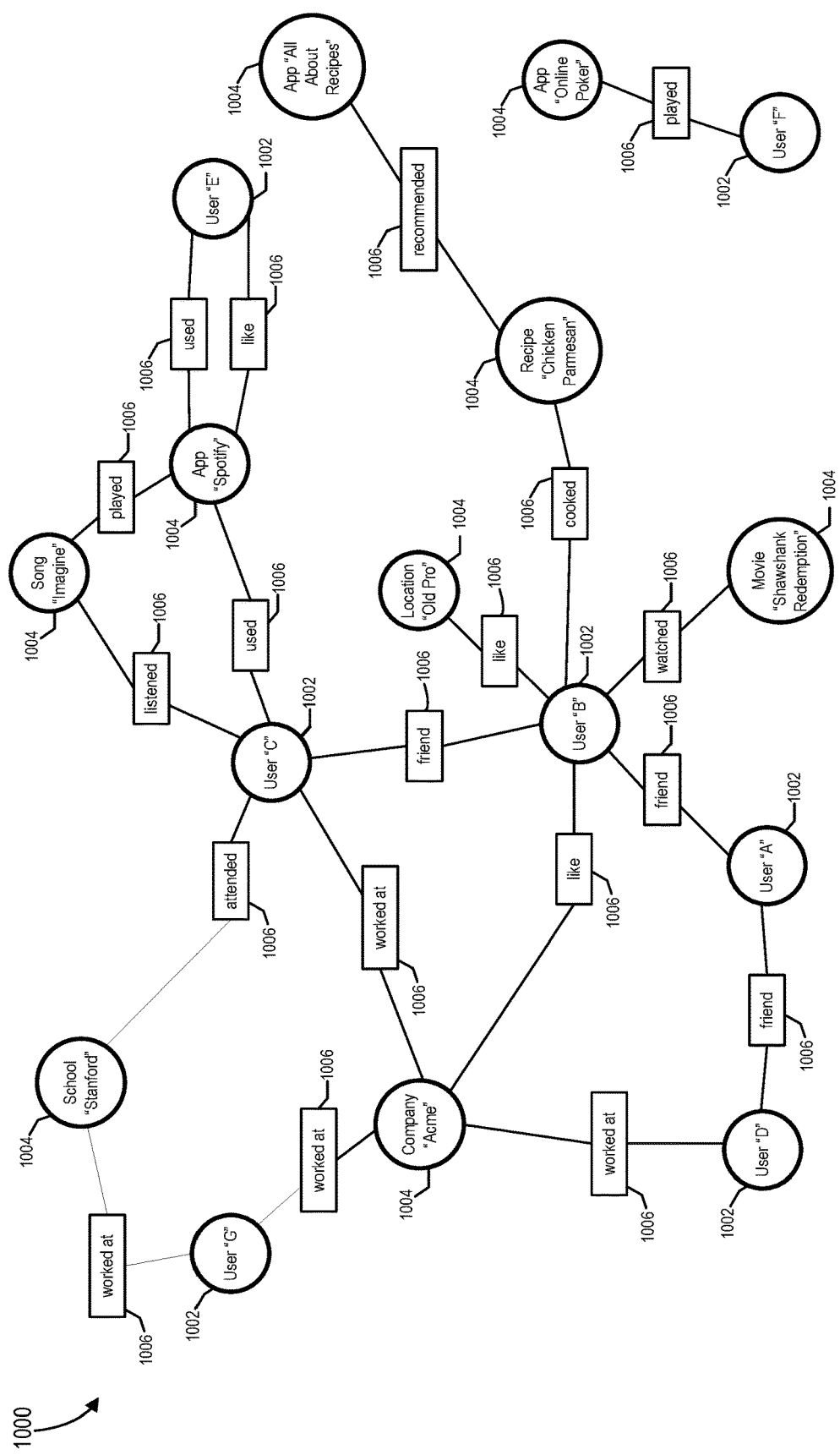
FIG. 10 illustrates a social graph in accordance with one or more embodiments.

FIG. 10 illustrates example social graph 1000. In particular embodiments, social networking system 902 may store one or more social graphs 1000 in one or more data stores. In particular embodiments, social graph 1000 may include multiple nodes—which may include multiple user nodes 1002 or multiple concept nodes 1004—and multiple edges 1006 connecting the nodes. Example social graph 1000 illustrated in FIG. 10 is shown, for didactic purposes, in a two-dimensional visual map representation. In particular embodiments, a social networking system 902, client system 906, or third-party system 908 may access social graph 1000 and related social-graph information for suitable applications. The nodes and edges of social graph 1000 may be stored as data objects, for example, in a data store (such as a social-graph database). Such a data store may include one or more searchable or query able indexes of nodes or edges of social graph 1000.

In particular embodiments, a user node 1002 may correspond to a user of social networking system 902. As an example and not by way of limitation, a user may be an individual (human user), an entity (e.g., an enterprise, business, or third-party application), or a group (e.g., of individuals or entities) that interacts or communicates with or over social networking system 902. In particular embodiments, when a user registers for an account with social networking system 902, social networking system 902 may create a user node 1002 corresponding to the user, and store the user node 1002 in one or more data stores. Users and user nodes 1002 described herein may, where appropriate, refer to registered users and user nodes 1002 associated with registered users. In addition or as an alternative, users and user nodes 1002 described herein may, where appropriate, refer to users that have not registered with social networking system 902. In particular embodiments, a user node 1002 may be associated with information provided by a user or information gathered by various systems, including social networking system 902. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1004 may correspond to a concept. As an example and not by way of limitation, a concept may correspond to a place (such as, for example, a movie theater, restaurant, landmark, or city); a website (such as, for example, a website associated with social-network system 902 or a third-party website associated with a web-application server); an entity (such as, for example, a person, business, group, sports team, or celebrity); a resource (such as, for example, an audio file, video file, digital photo, text file, structured document, or application) which may be located within social networking system 902 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including social networking system 902. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to social networking system 902. Profile pages may also be hosted on third-party websites associated with a third-party server 908. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept node 1004.

In particular embodiments, a concept node 1004 may represent a third-party webpage or resource hosted by a third-party system 908. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 906 to send to social networking system 902 a message indicating the user's action. In response to the message, social networking system 902 may create an edge (e.g., an "eat" edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, social networking system 902 may send a "friend request" to the second user. If the second user confirms the "friend request," social networking system 902 may create an edge 1006 connecting the first user's user node 1002 to the second user's user node 1002 in social graph 1000 and store edge 1006 as social-graph information in one or more of data stores. In the example of FIG. 10, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to an edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, social networking system 902 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 902 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, social networking system 902 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004 for "SPOTIFY").

In particular embodiments, social networking system 902 may create an edge 1006 between a user node 1002 and a concept node 1004 in social graph 1000. As an example and not by way of limitation, a user viewing a concept-profile page (such as, for example, by using a web browser or a special-purpose application hosted by the user's client system 906) may indicate that he or she likes the concept represented by the concept node 1004 by clicking or selecting a "Like" icon, which may cause the user's client system 906 to send to social networking system 902 a message indicating the user's liking of the concept associated with the concept-profile page. In response to the message, social networking system 902 may create an edge 1006 between user node 1002 associated with the user and concept node 1004, as illustrated by "like" edge 1006 between the user and concept node 1004. In particular embodiments, social networking system 902 may store an edge 1006 in one or more data stores. In particular embodiments, an edge 1006 may be automatically formed by social networking system 902 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social networking system 902). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 902 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 902) or RSVP (e.g., through social networking system 902) to an event associated with the advertisement. In addition or as an alternative, an advertisement may include social-networking-system context directed to the user. As an example and not by way of limitation, an advertisement may display information about a friend of the user within social networking system 902 who has taken an action associated with the subject matter of the advertisement.

In particular embodiments, social networking system 902 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 902 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 902 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 250%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 902 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 902 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 902 may calculate a coefficient based on a user's actions. Social networking system 902 may monitor such actions on the online social network, on a third-party system 908, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 902 may calculate a coefficient based on the user's actions with particular types of content. The content may be associated with the online social network, a third-party system 908, or another suitable system. The content may include users, profile pages, posts, news stories, headlines, instant messages, chat room conversations, emails, advertisements, pictures, video, music, other suitable objects, or any combination thereof. Social networking system 902 may analyze a user's actions to determine whether one or more of the actions indicate an affinity for subject matter, content, other users, and so forth. As an example and not by way of limitation, if a user may make frequently posts content related to "coffee" or variants thereof, social networking system 902 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 902 may calculate a coefficient based on the type of relationship between particular objects. Referencing the social graph 1000, social networking system 902 may analyze the number and/or type of edges 1006 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than user nodes 1002 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 902 may determine that the user has a higher coefficient with respect to the first photo than the second photo because having a tagged-in-type relationship with content may be assigned a higher weight and/or rating than having a like-type relationship with content. In particular embodiments, social networking system 902 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 902 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In particular embodiments, social networking system 902 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 906 of the user). A first user may be more interested in other users or concepts that are closer to the first user. As an example and not by way of limitation, if a user is one mile from an airport and two miles from a gas station, social networking system 902 may determine that the user has a higher coefficient for the airport than the gas station based on the proximity of the airport to the user.

In particular embodiments, social networking system 902 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 902 may provide information that is relevant to user's interests and current circumstances, increasing the likelihood that they will find such information of interest. In particular embodiments, social networking system 902 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 902 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 902 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 908 (e.g., via an API or other communication channel), or from another suitable system. In response to the request, social networking system 902 may calculate the coefficient (or access the coefficient information if it has previously been calculated and stored). In particular embodiments, social networking system 902 may measure an affinity with respect to a particular process. Different processes (both internal and external to the online social network) may request a coefficient for a particular object or set of objects. Social networking system 902 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 8, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, field Oct. 1, 2012, each of which is incorporated by reference in their entirety.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1004 corresponding to a particular photo may have a privacy setting specifying that the photo may only be accessed by users tagged in the photo and their friends. In particular embodiments, privacy settings may allow users to opt in or opt out of having their actions logged by social networking system 902 or shared with other systems (e.g., third-party system 908). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 908, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 902 may send a request to the data store for the object. The request may identify the user associated with the request and may only be sent to the user (or a client system 906 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
    detecting, at a server device, a live video stream originating from a first client device;
    determining a location of the first client device based on detecting the live video stream;
    identifying an event corresponding to the location of the first client device;
    receiving dynamic information associated with the event;
    providing, to the first client device, a plurality of template indicators corresponding to a plurality of video overlay templates associated with the event, wherein the plurality of template indicators comprises:
        a first template indicator associated with a first video overlay template, the first video overlay template comprising a first set of fields corresponding to discrete portions of the dynamic information associated with the event; and
        a second template indicator associated with a second video overlay template, the second video overlay template comprising a second set of fields corresponding to discrete portions of the dynamic information associated with the event, wherein the second set of fields comprises one or more fields corresponding to different discrete portions of the dynamic information associated with the event than the first set of fields from the first video overlay template;

receiving, from the first client device, a user selection of the first template indicator from the plurality of template indicators corresponding to the video overlay template associated with the event;

generating a video enhancement overlay for the live video stream, the video enhancement overlay comprising portions of the received dynamic information within the first set of fields of the first video overlay template; and providing, for display to a user associated with a second client device, the live video stream and the video enhancement overlay.

2. The method of claim 1, further comprising identifying the event from a plurality of previously created events based on a time of origination of the live video stream and the location of the first client device.

3. The method of claim 1, further comprising:
detecting, at the server device, a plurality of live video streams originating from a plurality of client devices at the location of the first client device; and
creating the event based on a number of the plurality of live video streams originating from the plurality of client devices while at the location.

4. The method of claim 1, further comprising:
receiving, from the first client device, a request to create the event associated with a time of origination of the live video stream and the location of the first client device; and
creating the event in response to receiving the request.

5. The method of claim 1, wherein receiving dynamic information associated with the event comprises receiving information associated with the event from a third party server device.

6. The method of claim 5, wherein the event comprises a sporting event, and wherein the discrete portions of the dynamic information comprise a score of the sporting event and a duration of time associated with the sporting event.

7. The method of claim 1, wherein receiving dynamic information associated with the event comprises receiving information from one or more sensors of the first client device.

8. The method of claim 7, wherein the discrete portions of the dynamic information comprise a current location of the first client device and a detected speed of the first client device.

9. The method of claim 1, wherein receiving dynamic information associated with the event comprises receiving information from a plurality of client devices located at the event.

10. The method of claim 9, wherein the discrete portions of the dynamic information comprise a determined noise level of the event based on captured noise data and detected motion data by the plurality of client devices.

11. The method of claim 1, further comprising:
detecting a trigger condition of the event based on the received dynamic information; and
providing, for display to the user associated with the second client device and in conjunction with the live video stream and the video enhancement overlay, an animation associated with the trigger condition of the event.

12. The method of claim 1, further comprising:
identifying information associated with a user of the first client device; and
providing, for display to the user associated with the second client device and in conjunction with the live video stream and the video enhancement overlay, the identified information associated with the user of the first client device.

13. The method of claim 1, further comprising identifying the plurality of video overlay templates each having one or more fields corresponding to discrete portions of the dynamic information associated with the event.

14. The method of claim 1, wherein:
the dynamic information associated with the event comprises data captured by one or more onboard sensors the first client device; and
the plurality of video overlay templates comprises one or more fields corresponding to types of data captured by the one or more onboard sensors of the first client device.

15. A system comprising:
at least one processor; and
at least one non-transitory computer readable storage medium storing instruction thereon that, when executed by the at least one processor, cause the system to:
detect, at a server device, a live video stream originating from a first client device;
determine a location of the first client device based on detecting the live video stream;
identify an event corresponding to the location of the first client device;
receive dynamic information associated with the event;
provide a plurality of template indicators corresponding to a plurality of video overlay templates associated with the event, wherein the plurality of template indicators comprises:
a first template indicator associated with a first video overlay template, the first video overlay template comprising a first set of fields corresponding to discrete portions of the dynamic information associated with the event; and
a second template indicator associated with a second video overlay template, the second video overlay template comprising a second set of fields corresponding to discrete portions of the dynamic information associated with the event, wherein the second set of fields comprises one or more fields corresponding to different discrete portions of the dynamic information associated with the event than the first set of fields from the first video overlay template;
receive, from the first client device, a user selection of the first template indicator from the plurality of template indicators corresponding to the video overlay template associated with the event;
generate a video enhancement overlay for the live video stream, the video enhancement overlay comprising portions of the received dynamic information within the first set of fields of the first video overlay template; and
provide, for display to a user associated with a second client device, the live video stream and the video enhancement overlay.

16. The system of claim 15, further comprising instructions that, when executed by the at least one processor, cause the system to identify the event from a plurality of previously created events based on a time of origination of the live video stream and the location of the first client device.

17. The system of claim 15, further comprising instructions that, when executed by the at least one processor, cause the system to:

receive, from the first client device, a request to create the event associated with a time of origination of the live video stream and the location of the first client device; and create the event in response to receiving the request.

18. A non-transitory computer readable medium storing instructions thereon that, when executed by at least one processor, cause a computer system to:
- detect, at a server device, a live video stream originating from a first client device;
- determine a location of the first client device based on detecting the live video stream;
- identify an event corresponding to the location of the first client device;
- receive dynamic information associated with the event;
- provide a plurality of template indicators corresponding to a plurality of video overlay templates associated with the event, wherein the plurality of template indicators comprises:
  - a first template indicator associated with a first video overlay template, the first video overlay template comprising a first set of fields corresponding to discrete portions of the dynamic information associated with the event; and
  - a second template indicator associated with a second video overlay template, the second video overlay template comprising a second set of fields corresponding to discrete portions of the dynamic information associated with the event, wherein the second set of fields comprises one or more fields corresponding to different discrete portions of the dynamic information associated with the event than the first set of fields from the first video overlay template;
- receive, from the first client device, a user selection of the first template indicator from the plurality of template indicators corresponding to the video overlay template associated with the event;
- generate a video enhancement overlay for the live video stream, the video enhancement overlay comprising portions of the received dynamic information within the first set of fields of the first video overlay template; and
- provide, for display to a user associated with a second client device, the live video stream and the video enhancement overlay.

19. The non-transitory computer readable medium of claim 18, further comprising instructions that, when executed by the at least one processor, further cause the computer system to identify the event from a plurality of previously created events based on a time of origination of the live video stream and the location of the first client device.

20. The non-transitory computer readable medium of claim 18, further comprising instructions that, when executed by the at least one processor, further cause the computer system to:
- receive, from the first client device, a request to create the event associated with a time of origination of the live video stream and the location of the first client device; and
- create the event in response to receiving the request.

* * * * *